US008930262B1

(12) United States Patent
Searson et al.

(10) Patent No.: US 8,930,262 B1
(45) Date of Patent: Jan. 6, 2015

(54) SYSTEMS AND METHODS OF ASSISTED STRATEGY DESIGN

(75) Inventors: Paul A. Searson, Derbyshire (GB); Maria M. Hastings, Nottingham (GB)

(73) Assignee: Experian Technology Ltd., Nottingham (GB)

( * ) Notice: Subject to any disclaimer, the term of this patent is extended or adjusted under 35 U.S.C. 154(b) by 69 days.

(21) Appl. No.: 13/287,050

(22) Filed: Nov. 1, 2011

Related U.S. Application Data

(60) Provisional application No. 61/409,220, filed on Nov. 2, 2010.

(51) Int. Cl.
*G06Q 40/00* (2012.01)

(52) U.S. Cl.
USPC .......................................................... 705/38

(58) Field of Classification Search
USPC .......................................................... 705/38
See application file for complete search history.

(56) References Cited

U.S. PATENT DOCUMENTS

| | | |
|---|---|---|
| 3,316,395 A | 4/1967 | Lavin et al. |
| 4,491,725 A | 1/1985 | Pritchard |
| 4,812,628 A | 3/1989 | Boston et al. |
| 4,872,113 A | 10/1989 | Dinerstein |
| 4,947,028 A | 8/1990 | Gorog |
| 5,239,462 A | 8/1993 | Jones et al. |
| 5,301,105 A | 4/1994 | Cummings, Jr. |
| 5,557,514 A | 9/1996 | Seare et al. |
| 5,583,760 A | 12/1996 | Klesse |
| 5,611,052 A | 3/1997 | Dykstra et al. |
| 5,644,778 A | 7/1997 | Burks et al. |
| 5,699,527 A | 12/1997 | Davidson |
| 5,704,044 A | 12/1997 | Tarter et al. |
| 5,764,923 A | 6/1998 | Tallman et al. |
| 5,832,447 A | 11/1998 | Rieker et al. |
| 5,870,721 A | 2/1999 | Norris |
| 5,878,403 A | 3/1999 | DeFrancesco |

(Continued)

FOREIGN PATENT DOCUMENTS

| | | |
|---|---|---|
| WO | WO 94/12943 | 6/1994 |
| WO | WO 95/12857 | 5/1995 |

(Continued)

OTHER PUBLICATIONS

CreditToolkit, Digital Matrix Systems, as printed out Mar. 4, 2008, pp. 2.

(Continued)

*Primary Examiner* — Hai Tran
(74) *Attorney, Agent, or Firm* — Knobbe, Martens, Olson & Bear LLP

(57) ABSTRACT

In an embodiment, a computer system performs a method of modifying a decision algorithm, such as an algorithm for assigning credit limits or other credit terms, via a graphical user interface. The system displays a graphical representation of a decision tree comprising a plurality of decision nodes. The decision nodes are associated with respective conditions, and at least a portion of the decision nodes are associated with an outcome to be assigned to an individual matching the associated respective conditions in accordance with the decision tree. The system receives a selection of a decision node and selects a parameter to be used to construct subnodes of the selected decision node, and constructs the subnodes. The system calculates an outcome for each subnode, and it updates the graphical representation of the decision tree to include the plurality of subnodes.

6 Claims, 16 Drawing Sheets

(56) References Cited

U.S. PATENT DOCUMENTS

| | | | |
|---|---|---|---|
| 5,884,287 A * | 3/1999 | Edesess | 705/36 R |
| 5,907,828 A | 5/1999 | Meyer et al. | |
| 5,926,800 A | 7/1999 | Baronowski et al. | |
| 5,930,759 A | 7/1999 | Moore et al. | |
| 5,930,776 A | 7/1999 | Dykstra et al. | |
| 5,933,809 A | 8/1999 | Hunt et al. | |
| 5,940,812 A | 8/1999 | Tengel et al. | |
| 5,950,179 A | 9/1999 | Buchanan et al. | |
| 5,966,699 A | 10/1999 | Zandi | |
| 5,970,478 A | 10/1999 | Walker et al. | |
| 5,995,947 A | 11/1999 | Fraser et al. | |
| 6,014,632 A | 1/2000 | Gamble et al. | |
| 6,018,723 A | 1/2000 | Siegel et al. | |
| 6,029,149 A | 2/2000 | Dykstra et al. | |
| 6,044,351 A | 3/2000 | Jones | |
| 6,044,352 A | 3/2000 | Deavers | |
| 6,067,522 A | 5/2000 | Warady et al. | |
| 6,073,104 A | 6/2000 | Field | |
| 6,088,686 A | 7/2000 | Walker et al. | |
| 6,098,052 A | 8/2000 | Kosiba et al. | |
| 6,108,641 A | 8/2000 | Kenna et al. | |
| 6,129,273 A | 10/2000 | Shah | |
| 6,144,948 A | 11/2000 | Walker et al. | |
| 6,163,770 A | 12/2000 | Gamble et al. | |
| 6,171,112 B1 | 1/2001 | Clark et al. | |
| 6,185,543 B1 | 2/2001 | Galperin et al. | |
| 6,208,973 B1 | 3/2001 | Boyer et al. | |
| 6,311,169 B2 | 10/2001 | Duhon | |
| 6,374,229 B1 | 4/2002 | Lowrey et al. | |
| 6,374,230 B1 | 4/2002 | Walker et al. | |
| 6,385,594 B1 | 5/2002 | Lebda et al. | |
| 6,405,181 B2 | 6/2002 | Lent et al. | |
| 6,453,297 B1 | 9/2002 | Burks et al. | |
| 6,456,983 B1 | 9/2002 | Keyes et al. | |
| 6,513,018 B1 | 1/2003 | Culhane | |
| 6,587,841 B1 | 7/2003 | DeFrancesco | |
| 6,598,030 B1 | 7/2003 | Siegel et al. | |
| 6,611,816 B2 | 8/2003 | Lebda et al. | |
| 6,684,093 B2 | 1/2004 | Kuth | |
| 6,826,535 B2 | 11/2004 | Wood et al. | |
| 6,847,942 B1 | 1/2005 | Land et al. | |
| 6,901,406 B2 | 5/2005 | Nabe et al. | |
| 7,003,491 B2 | 2/2006 | Starkman | |
| 7,072,842 B2 | 7/2006 | Provost et al. | |
| 7,133,840 B1 | 11/2006 | Kenna et al. | |
| 7,171,371 B2 | 1/2007 | Goldstein | |
| 7,174,302 B2 | 2/2007 | Patricelli et al. | |
| 7,181,427 B1 | 2/2007 | DeFrancesco | |
| 7,191,150 B1 | 3/2007 | Shao et al. | |
| 7,191,451 B2 | 3/2007 | Nakagawa | |
| 7,197,468 B1 | 3/2007 | Patricelli et al. | |
| 7,212,995 B2 | 5/2007 | Schulkins | |
| 7,246,068 B2 | 7/2007 | Thomas, Jr. | |
| 7,249,076 B1 | 7/2007 | Pendleton et al. | |
| 7,295,988 B1 | 11/2007 | Reeves | |
| 7,298,872 B2 | 11/2007 | Glisson | |
| 7,305,359 B2 | 12/2007 | Bonnell | |
| 7,310,617 B1 | 12/2007 | Cunningham | |
| 7,328,276 B2 | 2/2008 | Alisuag | |
| 7,333,937 B2 | 2/2008 | Baldwin, Jr. et al. | |
| 7,346,576 B2 | 3/2008 | Lent et al. | |
| 7,379,913 B2 | 5/2008 | Steele et al. | |
| 7,380,707 B1 | 6/2008 | Fredman | |
| 7,409,369 B1 | 8/2008 | Homuth et al. | |
| 7,505,939 B2 | 3/2009 | Lent et al. | |
| 7,527,967 B2 | 5/2009 | Chao et al. | |
| 7,556,192 B2 | 7/2009 | Wokaty, Jr. | |
| 7,610,229 B1 * | 10/2009 | Kornegay et al. | 705/38 |
| 7,630,933 B2 | 12/2009 | Peterson et al. | |
| 7,711,636 B2 | 5/2010 | Robida et al. | |
| 7,747,559 B2 | 6/2010 | Leitner et al. | |
| 7,756,789 B2 | 7/2010 | Welker et al. | |
| 7,814,004 B2 | 10/2010 | Haggerty et al. | |
| 7,814,005 B2 | 10/2010 | Imrey et al. | |
| 7,818,228 B1 | 10/2010 | Coulter | |
| 7,840,484 B2 | 11/2010 | Haggerty et al. | |
| 7,860,786 B2 | 12/2010 | Blackburn et al. | |
| 7,904,306 B2 | 3/2011 | Johnson et al. | |
| 7,941,363 B2 | 5/2011 | Tanaka et al. | |
| 7,970,679 B2 | 6/2011 | Kasower | |
| 7,991,689 B1 | 8/2011 | Brunzell et al. | |
| 8,001,042 B1 | 8/2011 | Brunzell et al. | |
| 8,036,979 B1 | 10/2011 | Torrez et al. | |
| 8,078,524 B2 | 12/2011 | Crawford et al. | |
| 8,135,642 B1 | 3/2012 | Krause | |
| 8,160,960 B1 | 4/2012 | Fei et al. | |
| 8,195,549 B2 | 6/2012 | Kasower | |
| 8,234,498 B2 | 7/2012 | Britti et al. | |
| 8,315,943 B2 | 11/2012 | Torrez et al. | |
| 8,364,588 B2 | 1/2013 | Celka et al. | |
| 8,452,611 B1 | 5/2013 | Johnson et al. | |
| 2001/0029482 A1 | 10/2001 | Tealdi et al. | |
| 2001/0034618 A1 | 10/2001 | Kessler et al. | |
| 2001/0039523 A1 | 11/2001 | Iwamoto | |
| 2002/0010594 A1 | 1/2002 | Levine | |
| 2002/0133503 A1 | 1/2002 | Levine | |
| 2002/0077964 A1 | 6/2002 | Brody et al. | |
| 2002/0099641 A1 | 7/2002 | Mills et al. | |
| 2002/0107849 A1 | 8/2002 | Hickey et al. | |
| 2002/0147617 A1 | 10/2002 | Schoenbaum et al. | |
| 2002/0147669 A1 | 10/2002 | Taylor et al. | |
| 2002/0184054 A1 | 12/2002 | Cox et al. | |
| 2002/0188478 A1 | 12/2002 | Breeland et al. | |
| 2003/0018549 A1 | 1/2003 | Fei et al. | |
| 2003/0028402 A1 | 2/2003 | Ulrich et al. | |
| 2003/0036926 A1 | 2/2003 | Starkey et al. | |
| 2003/0037054 A1 | 2/2003 | Dutta et al. | |
| 2003/0046112 A1 | 3/2003 | Dutta et al. | |
| 2003/0050795 A1 | 3/2003 | Baldwin, Jr. et al. | |
| 2003/0050796 A1 | 3/2003 | Baldwin, Jr. et al. | |
| 2003/0078877 A1 | 4/2003 | Beirne et al. | |
| 2003/0208412 A1 | 11/2003 | Hillestad et al. | |
| 2003/0229507 A1 | 12/2003 | Perge | |
| 2003/0233259 A1 | 12/2003 | Mistretta et al. | |
| 2004/0030649 A1 | 2/2004 | Nelson et al. | |
| 2004/0049473 A1 | 3/2004 | Gower et al. | |
| 2004/0054619 A1 | 3/2004 | Watson et al. | |
| 2004/0064402 A1 | 4/2004 | Dreyer et al. | |
| 2004/0073456 A1 | 4/2004 | Gottlieb et al. | |
| 2004/0128230 A1 | 7/2004 | Oppenheimer et al. | |
| 2004/0177030 A1 | 9/2004 | Shoham | |
| 2004/0215556 A1 | 10/2004 | Merkley, Jr. et al. | |
| 2004/0225545 A1 * | 11/2004 | Turner et al. | 705/8 |
| 2004/0230534 A1 | 11/2004 | McGough | |
| 2004/0267660 A1 | 12/2004 | Greenwood et al. | |
| 2005/0065874 A1 | 3/2005 | Lefner et al. | |
| 2005/0086071 A1 | 4/2005 | Fox, Jr. et al. | |
| 2005/0086072 A1 | 4/2005 | Fox, Jr. et al. | |
| 2005/0137912 A1 | 6/2005 | Rao et al. | |
| 2005/0187860 A1 | 8/2005 | Peterson et al. | |
| 2005/0209880 A1 | 9/2005 | Drelicharz et al. | |
| 2005/0209922 A1 | 9/2005 | Hofmeister | |
| 2005/0228748 A1 | 10/2005 | Togher et al. | |
| 2006/0031158 A1 | 2/2006 | Orman | |
| 2006/0080139 A1 | 4/2006 | Mainzer | |
| 2006/0080233 A1 | 4/2006 | Mendelovich et al. | |
| 2006/0080251 A1 | 4/2006 | Fried et al. | |
| 2006/0100954 A1 | 5/2006 | Schoen | |
| 2006/0155639 A1 | 7/2006 | Lynch et al. | |
| 2006/0173772 A1 | 8/2006 | Hayes et al. | |
| 2006/0178971 A1 | 8/2006 | Owen et al. | |
| 2006/0178983 A1 | 8/2006 | Nice et al. | |
| 2006/0235743 A1 | 10/2006 | Long et al. | |
| 2006/0282359 A1 | 12/2006 | Nobili et al. | |
| 2007/0027778 A1 | 2/2007 | Schellhammer et al. | |
| 2007/0118410 A1 | 5/2007 | Nadai | |
| 2007/0198336 A1 | 8/2007 | Thompson | |
| 2007/0198407 A1 | 8/2007 | Winter | |
| 2007/0214076 A1 * | 9/2007 | Robida et al. | 705/38 |
| 2007/0258626 A1 | 11/2007 | Reiner | |
| 2007/0279187 A1 | 12/2007 | Hekmatpour et al. | |
| 2007/0288360 A1 | 12/2007 | Seeklus | |
| 2007/0299699 A1 | 12/2007 | Policelli et al. | |
| 2008/0015979 A1 | 1/2008 | Bentley | |

(56) References Cited

U.S. PATENT DOCUMENTS

| | | | |
|---|---|---|---|
| 2008/0059317 A1 | 3/2008 | Chandran et al. |
| 2008/0065569 A1 | 3/2008 | Dutt et al. |
| 2008/0086400 A1 | 4/2008 | Ardelean et al. |
| 2008/0109315 A1 | 5/2008 | Huang et al. |
| 2008/0120133 A1 | 5/2008 | Krishnaswami et al. |
| 2008/0172324 A1 | 7/2008 | Johnson |
| 2008/0189202 A1 | 8/2008 | Zadoorian et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294540 A1 | 11/2008 | Celka et al. |
| 2009/0044279 A1 | 2/2009 | Crawford et al. |
| 2009/0222308 A1 | 9/2009 | Zoldi et al. |
| 2009/0276244 A1 | 11/2009 | Baldwin, Jr. et al. |
| 2010/0142698 A1 | 6/2010 | Spottiswoode et al. |
| 2010/0299262 A1 | 11/2010 | Handler |
| 2012/0116950 A1 | 5/2012 | Torrez et al. |
| 2012/0158574 A1 | 6/2012 | Brunzell et al. |
| 2013/0006825 A1 | 1/2013 | Robida et al. |
| 2013/0080315 A1 | 3/2013 | Torrez et al. |
| 2013/0173450 A1 | 7/2013 | Celka et al. |

FOREIGN PATENT DOCUMENTS

| | | |
|---|---|---|
| WO | WO 99/46710 | 9/1999 |
| WO | WO 01/04821 | 1/2001 |
| WO | WO 01/41355 | 6/2001 |
| WO | WO 02/13047 | 2/2002 |
| WO | WO 2004/114160 | 12/2004 |
| WO | WO 2008/021061 | 2/2008 |
| WO | WO 2008/047918 | 12/2008 |

OTHER PUBLICATIONS

"Debt Settlement: Watch Video on how to Pay Your Debt Faster" http://www.debtconsolidationcare.com/debt-settlement.html printed Jan. 9, 2013 in 6 pages.
"Qualifying for Debt Settlement" http://www.certifieddebt.com/debt/settlement-qualifications.shtml printed Jan. 9, 2013 in 2 pages.
"Resolve Debt for Less: With Help from Freedom Financial" http://www.debtsettlementusa.com/ printed Jan. 9, 2013 in 6 pages.
"Settling Your Debts—Part 1 in Our Debt Settlement Series" http://www.creditinfocenter.com/debt/settle_debts.shtml printed Jan. 9, 2013 in 6 pages.
"ACS Company Birch & Davis Wins Texas CHIP Contract," PR Newswire, Section: Financial News, 3 pgs., Dallas, TX, May 17, 2000.
"An Even Better Solution to Financing Elective Surgery . . . ", Unicorn Financial, pp. 7, http://web.archive.org/web/20000816161359/http://www.unicornfinancia.com/, as downloaded Oct. 15, 2008.
"Authorizing Safety Net Public Health Programs," Hearing before the Subcommittee on Health of the Committee on Energy and Commerce, House of Respresentatives, One Hundred Seventh Congress, First Session, Serial No. 107-57, dated Aug. 1, 2001, 226 pgs.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
"Financing Medical Procedures A Lucrative But Risky Business," Credit Risk Management Report, vol. 10, Issue 15, 2 pgs., dated Aug. 7, 2000.
"Improving the Implementation of State Children's Health Insurance Programs for Adolescents Report of an Invitational Conference Sponsored by the American Academy of Pediatrics, Section on Adolescent Health," Pediatrics, Official Journal of the American A.
"MediCredit Announces Major Investment from Medstone; Financing Will Enable Dramatic Expansion of Online Services," Business Wire, pp. 2, dated May 12, 2000.
"Web Site Fuels Elective Surgery Trend; The Complete Resource to Paying for Cosmetic Surgery, Laser Vision Correction and Cosmetic Dentistry," Business Wire, 2 pgs, dated Apr. 7, 1999.

An Expert System for Determining Medicaid Eligibility, Journal of Medical Systems, vol. 12, Nov. 5, 1988, in 10 pages.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers Internet speeds credit checks System tailored for doctors, dentists," The Globe and Mail (Canada), Section: Report on Business Special Reports, dated Mar. 18, 1997, 2 pgs.
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr Ph.D., et al. , Utility Payments as Alternative Credit Data: A Reality Check, Asset Builders of America, Inc., Oct. 5, 2006, pp. 1-18, Washington, D.C.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urbane Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Cheney, Karen, "Fix Your Nose, If You Wish, But Not With This New Loan," Money Magazine, vol. 27, No. 5, 1 pg., dated May 1, 1998.
DentalFinancing.com, "Financial services for patients and dental professionals,", 7 pgs., as downloaded from http://web.archive.org/web/20010607151954/www.dentalfinancing.com/dentist/index.asp (1 of 2) ]Oct. 15, 2008 3:55:16 PM].
Dietz, Ellen, "Dental Office Management," 8 pgs., pp. 316-321, Copyright 2000.
eFunds Introduces QualiFileSM, Deluxe Corporation, Sep. 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Experian, Custom Strategist and Qualifile from Funds, 2000, in 2 pages.
Felsenthal, Edward, "Health Costs; Managed Care Helps Curb Costs, Study Says," The Wall Street Journal, dated Aug. 12, 1991.
Gilje, Shelby, "Credit Agency Moving Into Health Care," NewsRoom, Seattle Times, WA, Section: SCENE, Dated Mar. 22, 1995, 3 pgs., as downloaded from http://web2.westlaw.com/result/documenttext.aspx?rs=WLW8.03&ss+CNT&rp=%2fWelc . . . on Mar. 19, 2008.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr . . . , 3 pgs.
Henry, M.D., Kimberly A., "The Face-Lift Sourcebook," copyright 2000, 3 pgs. (p. 207).
IndiCareTM, On-Line Patient Assistant Program, Website Users Manual, JBI Associates, LLC, 1997.
Kent, Heather, "Huge declines in price as competition heats up in Vancouver's booming laser-surgery market," CMAJ, Oct. 5, 1999; 161 (7), pp. 857-858.
Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.
Mathematica Policy Research, Inc., "1998 Health Care Survey of DoD Beneficiaries: Technical Manual," Jul. 1999.

(56) References Cited

OTHER PUBLICATIONS

McGovern, Celeste, Jayhawk Medical Acceptance. (Brief Article), Alberta Report, 1 pg., dated Aug. 23, 1999.

McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.

MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].

NewsRoom, Insurance Regulator, State Survey, "CIGNA Report Withdrawn As Foe Sees Opening," Sep. 9, 1996, vol. 8, Issue 34, 4pgs, as downloaded at http://web2.westlaw.com/result/documenttext.aspx?rs=WLW8.03&ss=CNT&rp=%2fWeic . . . on Mar. 19, 2008.

Next Card: About Us; as download on Oct. 23, 2009 from http://web.cba.neu.edu/~awatson/NextCardCase/NextCardAboutUs.htm (Copyright 1997-2001); pp. 1-10.

Paustian, Chuck; "Every Cardholer a King Customers get the Full Treatment at Issuers' Web Sites"; Card Marketing; New York; vol. 5, Issue, 3; pp. 1-3; Mar. 2001.

Pennsylvania Law Weekly, "Discriminating Against Victims Admitting Domestic Abuse can Lead to Denial of Insurance Coverage," vol. XVIII, No. 26, dated Jun. 26, 1996, 2 pgs., as downloaded from http://web2.westlaw.com/result/documenttext.aspx?rs=WLW8.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.

Rubin, Rita, "Cosmetic Surgery on Credit: Finance plans let patients reconstruct now, pay later," The Dallas Morning News, 2 pgs., dated Sep. 10, 1988.

SearchAmerica, Solutions, "Payment Advisor Suite TM" 2008.

Selz, Michael, "Lenders Find Niche in Cosmetic Surgery That Isn't Insured—But Since You Can't Repossess A Nose Job, Risks Aren't Restricted to the Patients," Wall Street Journal, New York, N.Y., Jan. 1997, p. A.1, 3 Pgs.

State of Wisconsin, Division of Health Care Financing, Department of Health and Family Services: 1999-2001 Biennial Report, pp. 17-21.

Stein, Benchmarking Default Prediction Models: Pitfalls and Remedies in Model Validation, Moody's KMV, Revised Jun. 13, 2002, Technical Report #020305; New York.

Texas Department of Human Services, 1999 Annual Report, 60 Years of Progress, Medial Services 9P137, Publication No. DHS-600-FY99.

thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].

Thomas, David, "Report on Networks and Electronic Communications Newcourt Credit turns to extranet Services / A PC connects to 1,200 users at once." The Globe and Mail (Canada), Section: Report on Business Special Report, 2 pgs., dated Nov. 12, 1996.

Washington State Office of Public Defense, "Criteria and Standards for Determining and Verifying Indigency," dated Feb. 9, 2001.

Webpage printed from http://www.magnum.net/pdfs/RapUpBrochure.pdf on Mar. 4, 2008.

Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.

Wisconsin Department of Workforce Development, BadgerCare Medicaid Application Credit Report Authorization Form, dated Jun. 21, 2001.

Wisconsin Department of Workforce Development, BadgerCare Medicaid Notification of Eligibility, dated Jul. 25, 2000.

Zoot—Decision Engine, www.zootweb.com/decision_engine.html, as printed on Mar. 3, 2008.

Zoot—Pre-Built Standard Attributes, www.zootweb.com/credit_attributes.html as printed Mar. 3, 2008.

\* cited by examiner

| SEGMENT | OUTCOME | CASES | AVG. CREDIT LIMIT |
|---|---|---|---|
| RISK SCORE BANDS | | 18,050 | $4,654 |
|   UNDER 500 | Min Classic | 0 | - |
|   500 TO 650 | Max Classic | 0 | - |
|   OVER 650 | | 18,050 | $4,654 |
|     REVOLVER SCORE BANDS | | 18,050 | $4,654 |
|       UNDER 600 | Min Gold | 705 | $3,000 |
|       600 TO 750 | Max Gold | 7,565 | $4,000 |
|       751 TO 900 | Min Platinum | 8,410 | $5,000 |
|       OVER 900 | Max Platinum | 1,370 | $7,000 |

FIG. 7

NEXT BEST SPLIT ANALYSIS ← 1101

TREE GROWING PROFILE: SPLITS OF UP TO 3-INTERVALS
TARGET CHARACTERISTIC: ACC DATA CC.GB FLAG ON ACCEPTS

↙ 1102

| NAME ← 1103 | PREDICTIVE RANKING | NUMBER OF RECORDS | CHI/OMEGA SQUARE |
|---|---|---|---|
| REVOLVER SCORECARD SCORE (1105, 1104) | 1 | 8,410 | 32.88 |
|     UNDER 780 — 1106 | | 2,195 | |
|     780 TO 800 — 1107 | | 1,355 | |
|     OTHERS — 1108 | | 4,860 | |
| MARITAL STATUS | 2 | 8,410 | 13.919 |
| MONTHLY DISPOSABLE INCOME | 3 | 8,410 | 2.915 |

FIG. 11

| SEGMENT | OUTCOME | CASES | AVG. CREDIT LIMIT |
|---|---|---|---|
| RISK SCORE BANDS | | 18,050 | $4,654 |
|   UNDER 500 | Min Classic | 0 | - |
|   500 TO 650 | Max Classic | 0 | - |
|   OVER 650 | | 18,050 | $4,654 |
|     REVOLVER SCORE BANDS | | 18,050 | $4,654 |
|       UNDER 600 | Min Gold | 705 | $3,000 |
|       600 TO 750 | Max Gold | 7,565 | $4,000 |
|       751 TO 900 —705a | | 8,410 | $5,000 |
|         REVOLVER SCORECARD SCORE | | 8,410 | $5,000 |
|           UNDER 780 —1201 | Min Platinum | 2,195 | $5,000 |
|           780 TO 800 —1202 | Min Platinum | 1,355 | $5,000 |
|           OTHERS —1203 | Min Platinum | 4,680 | $5,000 |
|       OVER 900 | Max Platinum | 1,370 | $7,000 |

FIG. 12

PROPOSE BEST OUTCOMES

NAME: MAXIMIZE LIMITS ASSIGNED
MEASURE: SUM CREDIT LIMIT
DIRECTION: MAXIMIZE
                                    — 1501
CONSTRAINTS:      — 1502
                                                    — 1503

| Outcome | Active | Eligible | Max Bad Debt | Max Credit Limit | Max Cases |
|---|---|---|---|---|---|
| Overall | No | ☐ | $10,000,000 | $80,000,000 | |
| Min Classic | No | ☐ | | | |
| Max Classic | Yes | ☑ | | | |
| Min Gold | Yes | ☑ | | | |
| Max Gold | Yes | ☑ | | | |
| Min Platinum | Yes | ☑ | | | |
| Max Platinum | Yes | ☑ | | | |

1506      1504        1505

ASSIGNMENTS:   — 1507

◉ ALL NODES       ○ ONLY UNASSIGNED NODES

PROPOSE BEST OUTCOMES – ANALYSIS FOR REVOLVER SCORE BANDS
GOAL: MAXIMIZE LIMITS ASSIGNED

| SEGMENT | OUTCOME (1601) | SUM CREDIT LIMIT (1602) | SUM BAD DEBT (1603) |
|---|---|---|---|
| REVOLVER SCORE BANDS | | 60,241,000 | 9,997,400 |
|   UNDER 600 | Min Gold | 2,115,000 | *Previous value: 13,953,000* |
|   600 TO 750 | Min Gold | 22,470,000 | 4,494,000 (1604) |
|   751 TO 900 | | 26,066,000 | 3,909,900 |
|     REVOLVER SCORECARD SCORE | | 26,066,000 | 3,909,900 |
|       UNDER 780 | Min Gold | 6,489,000 | 973,350 |
|       780 TO 800 | Max Gold | 5,420,000 | 813,000 |
|       OTHERS | Min Gold | 14,157,000 | 2,123,550 |
|   OVER 900 | Max Platinum | 9,590,000 | 959,000 |

OUTCOMES (1605)

| Name | Color | Active | Treatment | Sum Credit Limit | Sum Bad Debt |
|---|---|---|---|---|---|
| Min Classic | ||||||||||||| | Y | $1000 limit | | |
| Max Classic | \\\\\\\\\\ | Y | $2000 limit | | |
| Min Gold | ///////// | Y | $3000 limit | 45,231,000 | 8,225,400 |
| Max Gold | | Y | $4000 limit | 5,420,000 | 813,000 |
| Min Platinum | ######## | Y | $5000 limit | | |
| Max Platinum | XXXXXXXX | Y | $6000 limit | 9,590,000 (1606) | 959,000 (1607) |

1608 → [APPLY] [MODIFY] [CANCEL]

FIG. 16

SYSTEMS AND METHODS OF ASSISTED STRATEGY DESIGN

CROSS-REFERENCE TO RELATED APPLICATIONS

This application claims priority to U.S. Provisional Patent Application No. 61/409,220 filed on Nov. 2, 2010 and entitled ASSISTED DESIGN ENVIRONMENT. The above-identified application is hereby incorporated by reference as if set forth herein in its entirety.

BACKGROUND

The disclosure herein relates to assisted strategy design, and in particular, systems and methods of automation and assistance in the creation and design of process flows and decision trees.

Many areas of business employ process flows, decision algorithms and related systems in order to conduct business in an automated fashion. For example, a credit card issuing company may employ numerous decision algorithms in order to determine whether to offer a credit card applicant a new line of credit and what credit limit to offer that applicant. Typically, such process and design algorithms are encoded in software written by software programmers. Such code may be difficult to modify by anyone other than the programmer who originally wrote the software.

However, in today's world, rapid modification of such decision and process algorithms may be required by businesses in order to remain competitive and up-to-date. The individuals with the greatest knowledge of how to modify these algorithms may not be the same as those people who designed and programmed the automated software. Accordingly, such hard-coded algorithms remain difficult or even impossible to modify, and can often be insufficient for today's business needs.

SUMMARY

Accordingly, embodiments disclosed herein include systems and methods for assisting and automating the design of process workflows, decision algorithms, and such other business processes as may be useful to companies and such entities. Various embodiments as disclosed herein may include graphical user interfaces and/or other user interfaces that may be easily manipulated without requiring extensive knowledge of computer software or computer programming. Additionally, embodiments disclosed herein enable individuals designing such process flows and decision algorithms to easily test and deploy those processes and algorithms.

BRIEF DESCRIPTION OF THE DRAWINGS

FIG. 7 shows a sample user interface for modifying a decision tree as used in an embodiment.

FIG. 11 shows a sample user interface displayed during a next best split analysis as used in an embodiment.

FIG. 12 shows a sample user interface of a decision tree after merging a selected split calculated by the next best split algorithm, as used in an embodiment.

FIG. 15 is a sample user interface for specifying rules and constraints for the calculation of proposed best outcomes, as used in an embodiment.

FIG. 16 is a sample user interface displaying proposed best outcomes as used in an embodiment.

DETAILED DESCRIPTION

Figure 1:
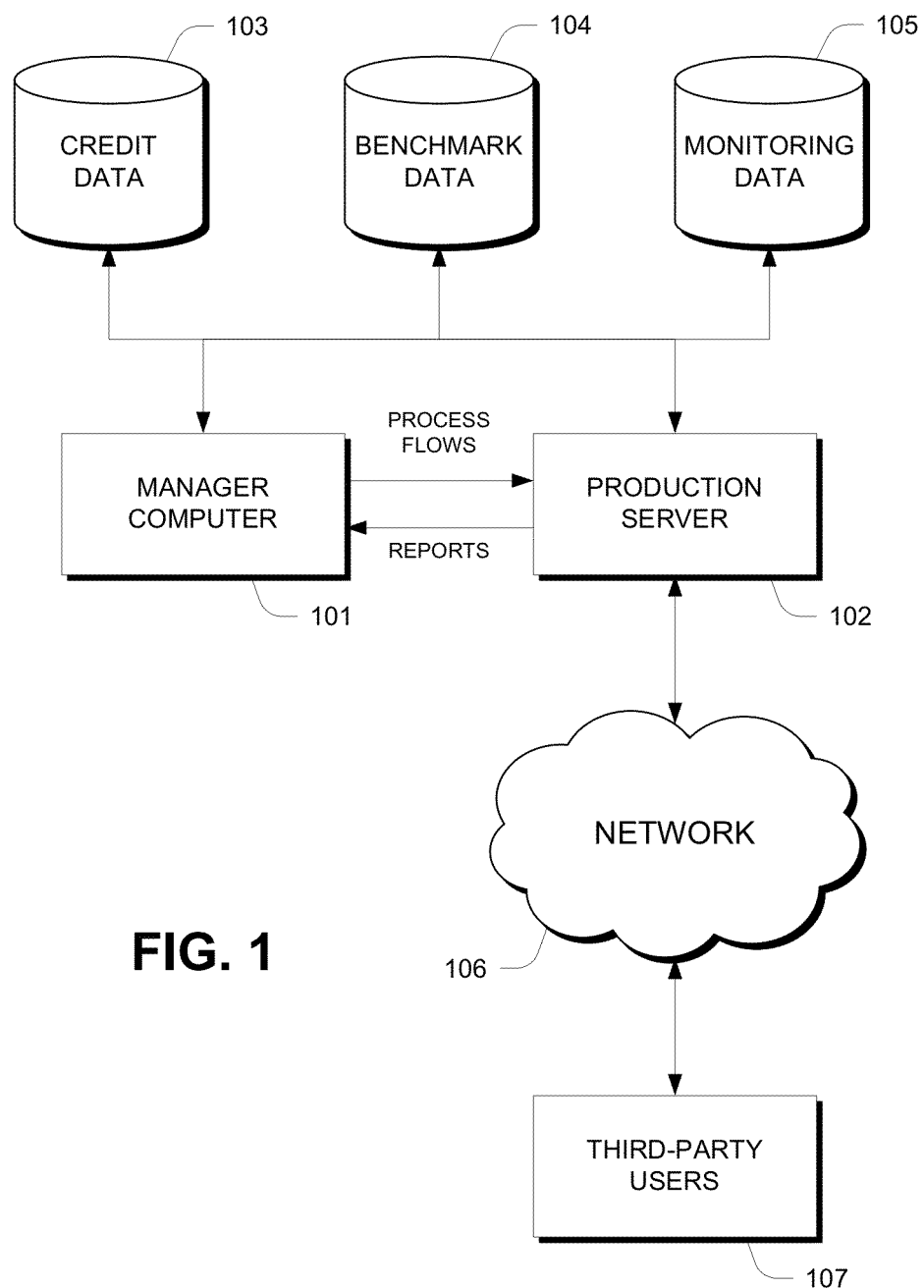
FIG. 1 is a block diagram of a system of assisted strategy design, as used in an embodiment.

FIG. 1 is a block diagram of a system of assisted strategy design, as used in an embodiment. The system includes one or more manager computers 101 which may include specialized software and/or hardware for implementing systems and methods as described through the specification. The manager computer may be operated by a credit risk manager or other individual to design and specify process flows, decision algorithms such as decision trees, and/or other related business processes or algorithms.

The system may also include one or more production servers 102. These servers may be used to perform business-related tasks such as implementing the various processes and algorithms designed on the manager computer 101. In an embodiment, manager computer 101 deploys process flows, algorithms, and other such business processes to the production server 102 via a network communication protocol. The production server 102 may in turn transmit one or more reports to the manager computer 101 on a periodic basis, upon request, or at any other appropriate time. A manager on the manager computer may review the reports received from the production server 102 and use the information contained in the report to update and improve the process flows, algorithms, and so on.

Both the manager computer 101 and the production server 102 may retrieve data from a number of data sources. For example, the manager computer 101 and/or the production server 102 may retrieve credit data from a credit data repository 103. The manager computer and/or the production server may further retrieve benchmark data from data repository 104 which may be, for example, historical data about previous individuals and/or accounts. Additionally, monitoring data may be retrieved and/or stored in repository 105. Additional data sources and/or any subset of these described data sources may be employed by the system.

In an embodiment, the manager computer may have access to different data sources than the production server. This may be useful, for example, in ensuring that the manager computer does not unintentionally modify data used by the production server which could introduce data errors and possible down times in the system.

In various embodiments, some or all of the data sources may be read-only sources. For example, the credit data repository 103 and the benchmark data repository 104 may be read-only, or may be writable only by particular users with appropriate access rights. Additionally, in various embodiments, the data repositories may be maintained on separate storage devices, they may be combined on a single storage device, and/or they may be distributed among multiple storage devices, such as in a cloud data storage system.

Production server 102 may further communicate, via a network 106, with any number of third-party users 107. Such third-party users may wish to take advantage of the various process flows, algorithms, and the like implemented by production server 102. Such third-party users 107 may include users, consumers, business entities, business partners, and further automated services, for example.

As one example, where the production server implements process flows for determining appropriate credit limits for current and/or potential customers of a credit lender, the third-party users 107 may be, for example, credit card applicants, loan approval officers, or other individuals interested in retrieving credit card application information.

The embodiments described herein relate to assisted strategy design software used to develop credit risk management process flows. In particular, the embodiments described herein relate to development software, operated on a computing system, for developing a strategy for analysis of information associated with credit applicants in order to determine to whom credit should be extended, how much credit should be extended, and so on. These embodiments illustrate one example of generating a decision process for offering credit cards to consumers. However, the development software may be used to enable development of other process flows, decision algorithms, and the like, for use in other decision-making tasks. For example, the software may be used to determine appropriate terms and features to the offer for a mobile phone service. The software may also be used to determine parameters for a loan, such as interest rates, loan repayment periods, and down payments, among other things. The software may similarly be used to optimize parameters for automobile loans, consumer loans, and the like. Additionally, the software may be used to develop terms for an insurance contract. The software may further be used in marketing campaigns, for example, to determine appropriate advertisements or offers to present to particular customers. Many other uses for the systems and methods described herein may be contemplated.

Additionally, embodiments of the systems and methods described herein may be operated via software executed on a computing system. The disclosed systems and methods may alternately be embodied in computing hardware, such as read-only memory or specialized microprocessors.

Example System Architecture

Figure 17:
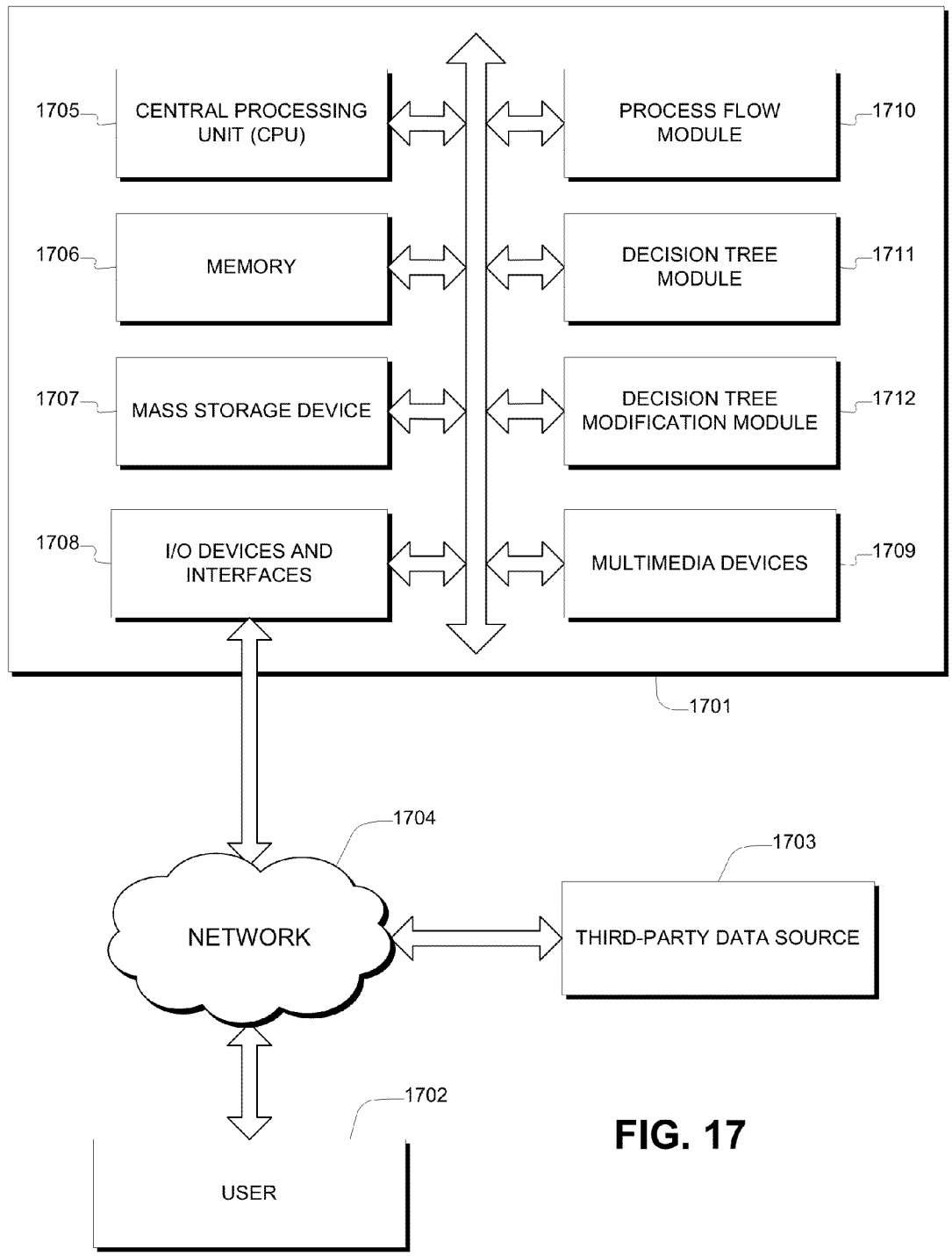
FIG. 17 is a block diagram illustrating one embodiment of a computing system that implements the systems and methods described herein.

FIG. 17 is a block diagram illustrating one embodiment of a computing system that implements the systems and methods described herein. In the embodiment of FIG. 17, a computing device 1701 is in communication with a user 1702, as well as an optional third-party data source 1703, via a network 1704. In an embodiment, the computing device 1701 receives data from one or more data sources 1703. The computing device 1701 may then perform analysis and prepare information for presentation to the user 1702. The manager computer 101, production server 102, and/or any other computing system described herein may include the same or similar components as the computing device 1701. Similarly, the computing devices 1701 may be used to implement any of the methods discussed herein.

The network 1704 may include any communication network or combination of communication networks, such as one or more of the Internet, LANs, WANs, MANs, etc., for example. In the embodiment of FIG. 17, the computing device 1701 includes a computing system having one or more computing devices (e.g., computers). The computing device 1701 may include, for example, a single computing device, a computer server, a smart storage unit, or a combination of one or more computing devices and/or computer servers. Depending on the embodiment, the components illustrated in the computing device 1701 may be distributed amongst multiple devices, such as via a local area or other network connection. In other embodiments the computing device 1701 may include fewer and/or additional components that are illustrated in FIG. 17.

The exemplary computing device 1701 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing device 1701 may be controlled by a proprietary operating system. Conventional operating systems control and schedule computer processes for execution, perform memory management, provide file system, networking, I/O services, and provide a user interface, such as a graphical user interface ("GUI"), among other things.

The computing device 1701 includes one or more central processing units ("CPU") 1705, which may each include one or more conventional or proprietary microprocessor(s). The computing device 1701 may further include one or more memories 1706, such as random access memory ("RAM"), for temporary storage of information, read only memory ("ROM") for permanent storage of information, and/or a mass storage device 1707, such as a hard drive, diskette, or optical media storage device. The memory 1706 may store software code, or instructions, for execution by the processor 1705 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the computing device 1701. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The exemplary computing device 1701 may include one or more input/output (I/O) devices and interfaces 1708, such as a keyboard, trackball, mouse, drawing tablet, joystick, game controller, touchscreen (e.g., capacitive or resistive touchscreen), touchpad, accelerometer, and/or printer, for example. The computing device 1701 may also include one or more multimedia devices 1709, such as a display device (also referred to herein as a display screen), which may also be one of the I/O devices 1708 in the case of a touchscreen, for example. Display devices may include LCD, OLED, or other thin screen display surfaces, a monitor, television, projector, or any other device that visually depicts user interfaces and data to viewers. The computing device 1701 may also include one or more multimedia devices, such as speakers, video cards, graphics accelerators, and microphones, for example.

In the embodiment of FIG. 17, the I/O devices and interfaces 1708 provides a communication interface to various external devices via the network 1704. For example, the computing device 1701 may be electronically coupled to the network 1704 via a wired, wireless, or combination of wired and wireless, communication link(s). The network 1704 may allow communication with various other computing devices and/or other electronic devices via wired or wireless communication links.

In the embodiment of FIG. 17, the computing device 1701 may include various modules described in further detail below. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C#, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 1701, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Example Modules

In the embodiment of FIG. 17, the computing device 1701 includes three modules, namely, a process flow module 1710 that provides a user interface for building process flows, a decision tree module 1711 that provides a user interface for managing decision trees, and an decision tree modification module 1712 that provides algorithms for automatically assisting in modifying decision trees, such as proposing best outcomes and splitting/growing decision trees. In other embodiments, the modules may be distributed across multiple devices, and may be controlled and/or operated by multiple different entities. These modules are configured to perform methods as described throughout this specification. In various embodiments, fewer or additional modules may be included within a computing system.

In an embodiment, process flow module 1710 provides one or more user interfaces for building and modifying process flows. The module may, among other things, display user interfaces such as those shown in FIGS. 2-3. Additionally, it may provide interfaces enabling a user to modify aspects of a process flow, such as the order of steps. It may also present reports, such as that shown in FIG. 5.

In an embodiment, decision tree module 1711 provides one or more user interfaces for managing decision trees. The module may, among other things, display user interfaces such as those shown in FIGS. 7-9. It may be invoked by selecting a step from a process flow during the invocation of module 1710, and it may further invoke decision tree modification module 1712.

Figure 10:
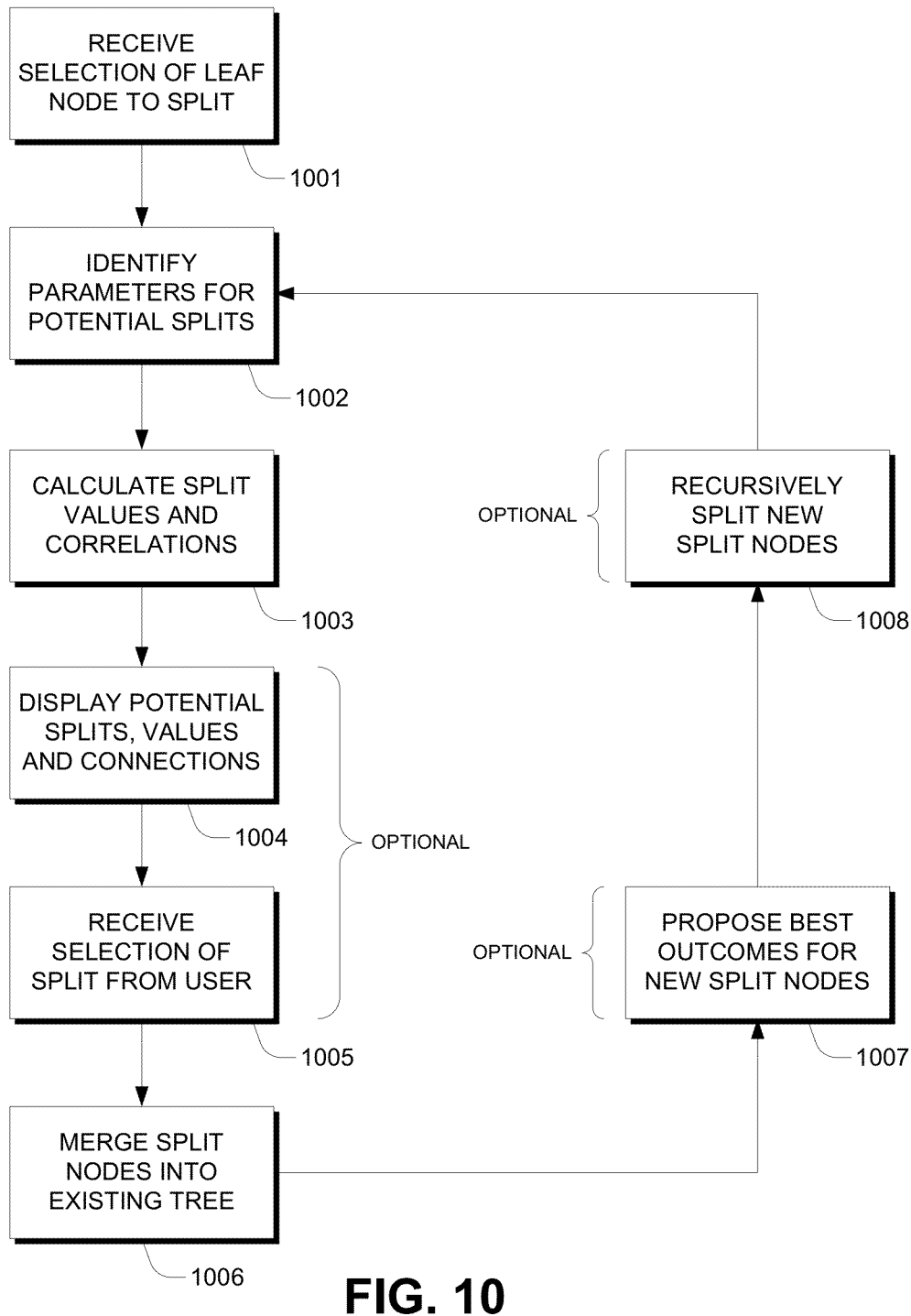
FIG. 10 is a flowchart of an algorithm for performing the next best split analysis as used in an embodiment.
Figure 14:
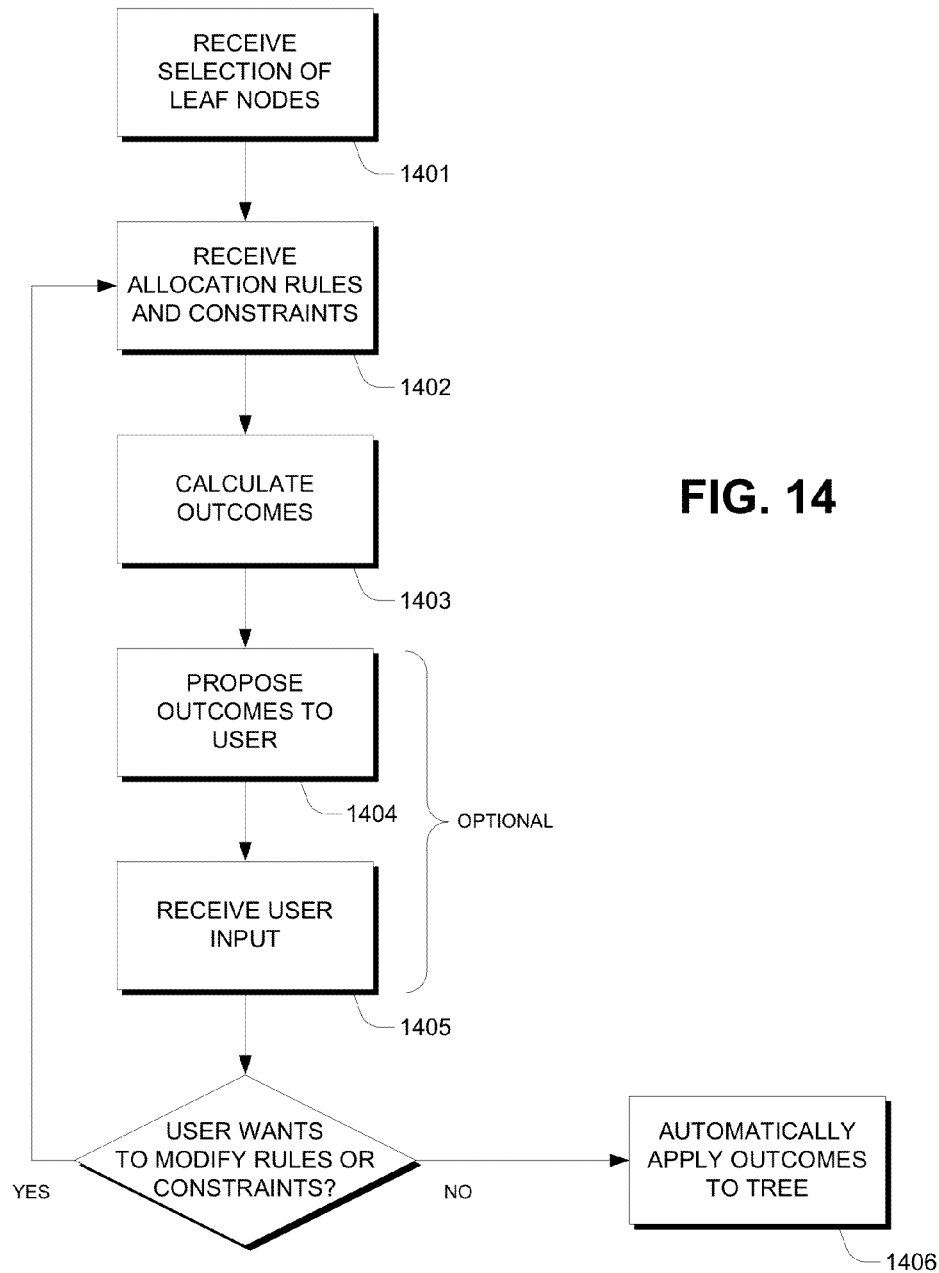
FIG. 14 is a flow chart of a process of automatically proposing outcomes for decision trees, as used in an embodiment.

In an embodiment, decision tree modification module 1712 provides one or more algorithms for automatically assisting in modifying decision trees. The module, may, among other things, perform "next best split" and "grow" computations as shown in FIG. 10, and perform computations to propose best outcomes for a decision tree or part of it as shown in FIG. 14.

Any of the above modules, and other modules, may embody the various systems and methods disclosed, as well as additional systems and methods. The modules described here are particularly pertinent to manager computer 101 of FIG. 1, and other modules may be included on the production server 102, such as a process flow execution module configured to perform methods such as that shown in FIG. 4, a decision tree module configured to execute decision trees such as that shown in FIG. 6, and a monitoring module configured to store monitoring data.

The computing device 1701 may be configured to acquire user data and other external data such as third-party data. The various modules and/or other modules may comprise software alone, hardware alone, or a combination of software and hardware. The device may be especially adapted to communicate using a variety of network or communications protocols in order to communicate with external data sources such as data repositories, network servers, online services, telecommunication services, distributed computing systems, and so on. Some of these protocols may include standard network protocols, such as HTTP, FTP, SNMP, or the like. The device may further include hardware drivers, such as USB, FireWire, Thunderbolt (Light Peak), or serial communications drivers, for example to communicate with devices in direct communication with the system.

The computing device 1701 may be configured to transmit, or initiate transmission of, data such as user interfaces, data reports, application programming interface data, or the like, to requesting entities, such as external user 1702, that have registered interest with the system. In one embodiment, the device provides the data in an unformatted data structure, such as in an XML, CSV, TXT, or other spreadsheet, text, or web accessible data structure. In other embodiments, the device provides information in user interfaces, such as user interfaces that are configured for rendering by a web browser, mobile device, tablet device, or other device or application, for display to users. A variety of different presentations may be provided. In some embodiments, the requesting entities may indicate presentation preferences or configurations (e.g., data formats and/or types of information), and the device may transmit data based on the indicated preferences or configurations. The presentation format may also be determined based on the type of device being used by the user.

In an embodiment, any or all of the modules described above and/or other modules are configured to act in real-time. Thus, when data is received by the modules, the modules process that data as soon as practicable or necessary to provide users with timely information. In order to achieve this, specialized hardware may be used to gain efficiency, and executable code may be designed to minimize latency or computation time. In an embodiment, the modules, possibly with other modules of the system, are executed within a real-time operating system, to enhance the responsiveness of the system.

Figure 2:
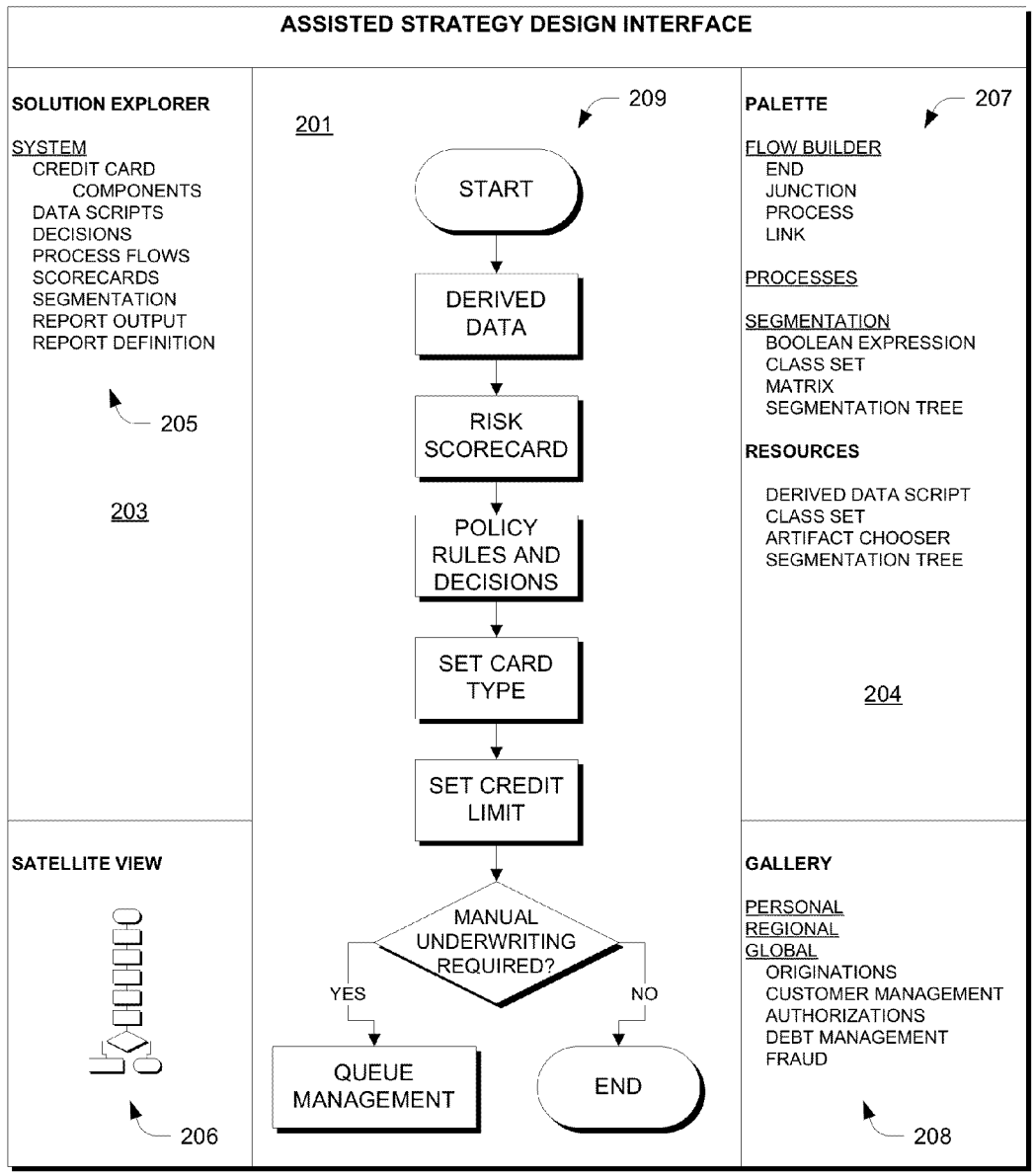
FIG. 2 is a sample user interface presented by an embodiment of assisted strategy design software.

FIG. 2 is a sample user interface presented by an embodiment of assisted strategy design software. The embodiment shown includes a design pane 201 which the user may use to design process flows and algorithms. The interface may further include one or more tool bars or tool panes 203 and 204 to provide options for the user in designing the process flows or algorithms.

Several of the tools are depicted in FIG. 2. For example, Solution Explorer 205 provides options for steps or components of the process flow as it is being built. Satellite View 206 enables the user to easily view the contents of the main pane 201. Palette 207 provides further for constructing process flows and decision algorithms. Gallery 208 enables a user to select personal, regional and/or global templates. In this example, a card origination template is selected from the global gallery to quickly create a basic process flow. Templates can range from very simple templates that include sections of business logic, for example, to complete strategies and associated configuration.

In an embodiment, the user may create and/or modify a process flow being designed by manipulating the user interface, and in particular, design pane 201. For example, FIG. 2 illustrates a process flow 209 that was generated from a template design. In this particular embodiment, process flow 209 illustrates a template card origination process that includes multiple processes, or steps, arranged in the design pane 201. Any or all of the steps may be customizable by the user, for example, by drag-and-drop operations and/or other input to the user interface.

Design pane 201 may further be used to design decision algorithms as described subsequently in the specification. In an embodiment, the particular tools shown in tool bars 203 and/or 204 may automatically be modified to provide appropriate tools for the particular task being performed in design pane 201.

In an embodiment, the development software advantageously allows for storage of outcome data at various stages in the flow of the process. For example, a user may wish to store output data that is generated by the "policy, rules, and decisions" step of process flow 209. Storing outcome data at various steps of the process flow allows for the stored data to be later accessed and analyzed for improving the decisioning process at each of the various steps so that the user is not required to modify the process based only on an end result.

Figure 3:
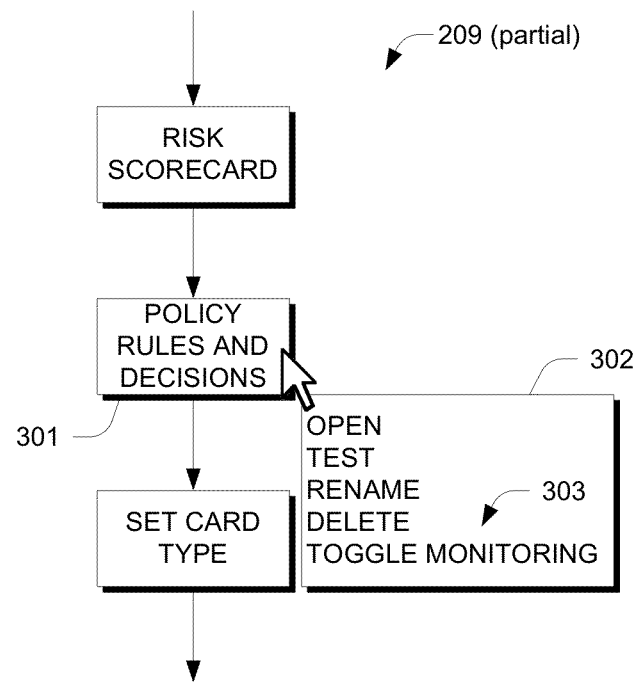
FIG. 3 is a portion of a user interface presented by an embodiment of assisted strategy design software.

In an embodiment, the ability to toggle storage of outcome data associated with any process of a process flow may be accomplished with a user interface interaction such as a command in a pop-up menu associated with a particular process, such as is depicted in the example of FIG. 3. When a user interacts with "policy, rules, and decisions" step 301 of process flow 209, a menu may be displayed. The interaction may be, for example, right-clicking on the particular step. In other embodiments, other interactions may be used, and forms of input other than a pop-up menu may be employed.

In the example of FIG. 3, process step 301 has been right-clicked so that menu 302 has been displayed. One of the options of menu 302 is "toggle monitoring" 303 which can be selected to enable or disable storage of outcome data at the particular process step 301. Thus, storage of outcome data at multiple steps of the process flow may be easily initiated and stopped. In one embodiment, the monitoring data is saved in an unstructured form which reduces the impact on the data storage structures and host applications. Furthermore, the monitoring data that is stored by the monitoring process is accessible to the development software such as in updating process flow parameters after testing a process flow for a period of time.

In an embodiment, the storage of data for monitoring is performed by a computing system different from the computing system operating the design software. For example, with respect to FIG. 1, the design software may operate on manager computer 101, while the storage of data for monitoring is done by production server 102. Thus, when the "toggle monitoring" option 303 is selected, the manager computer 101 may send an instruction to production server 102 to enable or disable monitoring. The instruction may then be sent to the production server 102 upon occurrence of an event, such as the user saving the process flow being designed, or the user requesting that the process flow be deployed for production. Alternatively, the instruction may be sent in real time so that monitoring may be started or stopped without significant delay.

In an embodiment, the particular data that is stored may be formatted in accordance with the particular nature of the step associated with the monitoring. For example, should the user enable monitoring for the policy, rules, and decisions step 301, the system may store the following data records:

| Decision/Policy Rules Monitoring Data | |
| --- | --- |
| Monitoring ID | Unique ID of the Decision Setter component |
| Number of fired categories | The number of rows in the following table:- |
| Category ID | Index to the Decision Category |
| Number of rules fired | The number of rows in the following table:- |
| Fired rule ID | Index to the fired rule |

Should the user enable monitoring on the "risk score card" step, the system may store the following data records:

| Scorecard Monitoring Data | |
| --- | --- |
| Monitoring ID | Unique ID of the Scorecard component |
| Intermediate Score | Score value, prior to any final transformation |
| Final Score | Final score value, after any final transformation |
| Score index | Graded score value |
| Number of scoring elements | The number of rows in the following table:- |
| Element id | Sequence number of the element |
| Outcome ID | Outcome ID (within element) |
| Characteristic value | (for univariate scoring) Data value for the scored element |
| Characteristic x-value | (for bi-variate scoring) Data value for the x-axis element |
| Characteristic y-value | (for bi-variate scoring) Data value for the y-axis element |

Other appropriate data may be stored for any of the other steps that may be included in a process flow. In an embodiment, the particular data required to be stored for a step may change as the user modifies parameters associated with that particular step. For example, the user may add additional entries into a risk scorecard which may necessitate the storage of further data records if monitoring is enabled for the risk scorecard step. Accordingly, in an embodiment, the system stores data records in a format such that future records may be added without requiring modification to existing stored data. In doing so, the system advantageously does not require rebuilding of previous data that has been stored, despite the format change. Thus, although in previous systems it may have been a complex and costly process to enable monitoring, and valuable data may simply have been discarded, the present system provides the flexibility to simply turn on monitoring in order to secure monitoring data without requiring manual modification of the data store. In an alternate embodiment, the system modifies the data formats and records, and it converts previously stored data to conform to the new formats and records that are required.

Figure 4:
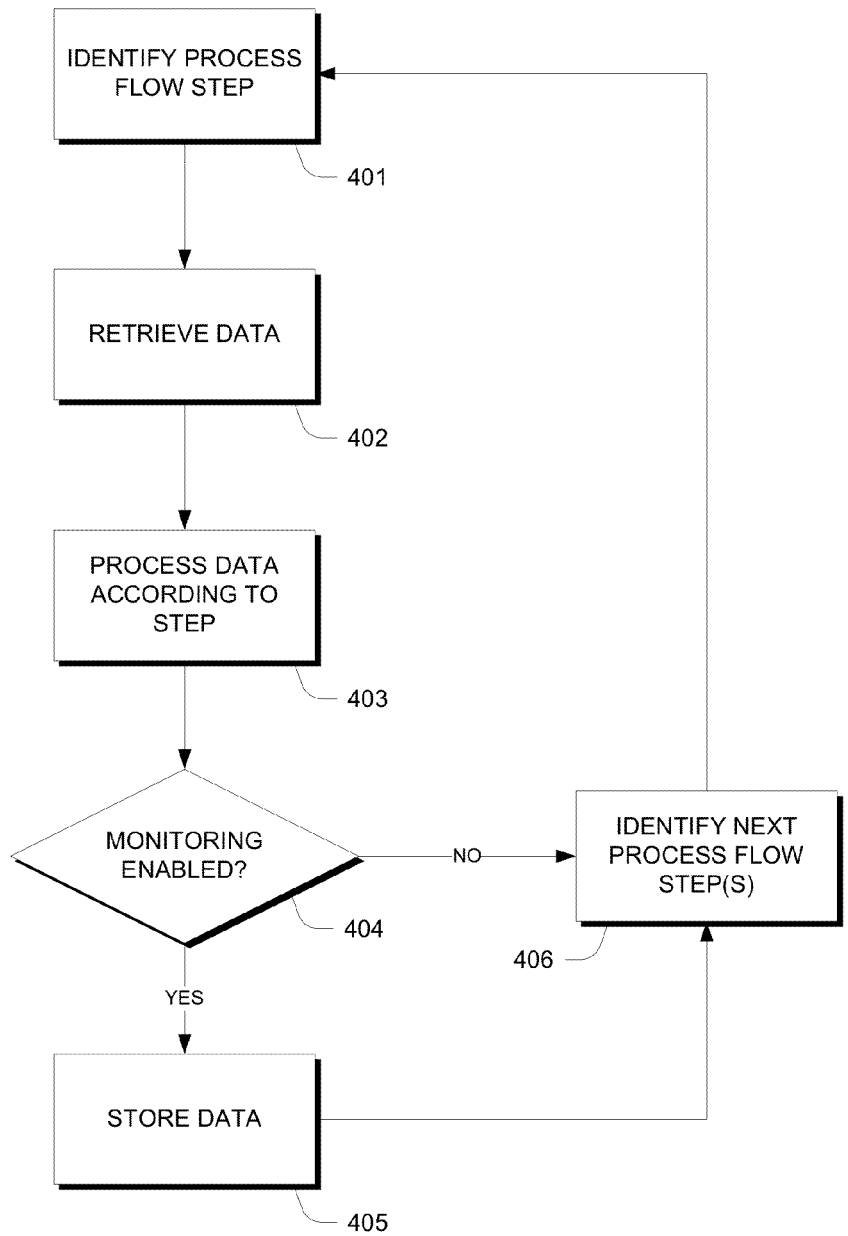
FIG. 4 is a flowchart of a process of executing a user specified process flow, as used in an embodiment.

FIG. 4 is a flowchart of a process of executing a user specified process flow, as used in an embodiment. The flowchart of FIG. 4 may be implemented, for example, on production server 102 of FIG. 1 in order to execute a user-specified process. Additionally, or alternatively, manager computer 101 of FIG. 1 may execute the process shown in FIG. 4 in order to test a newly designed process flow, for example. In various embodiments, additional blocks may be included, some blocks may be removed, and/or blocks may be connected or arranged differently from what is shown.

At block 401, a process flow step is identified. For example, upon initiating execution of a process flow, the first step in the process flow is identified. Alternatively, any step of a process flow may be otherwise manually or automatically selected.

At block 402, data is retrieved in accordance with the process flow step identified. The data may be retrieved from internal and/or external data sources such as the credit data repository 103, the benchmark data repository 104, and/or the monitoring data repository 105 shown in FIG. 1. The particular data to be retrieved may be identified based on data associated with the process flow step.

At block 403, the retrieved data is processed according to instructions associated with the process flow step, identified at block 401. Such data analysis may include executing decision algorithms specified by the creator of the process flow. Other data processing may include data aggregation, summarization, selection, calculation, and the like. The result of processing the data at block 403 may include output data resulting from the processing, and/or modifications to the retrieved data.

At block 404, the process flow step is reviewed to determine if monitoring has been enabled on the particular step. If monitoring has been enabled on that step, then, at block 405, data is stored, in accordance with the process flow step and any output generated at block 403. In an embodiment, data is temporarily stored in a first storage location at block 405, and then all of the temporarily stored data is moved to a second storage location after completion of all steps, so that bulk data transfer efficiencies may be realized. Otherwise, execution proceeds to block 406 where the next process flow step or steps are identified, based on data associated with the current process flow step. Once those next process flow steps are identified, then the operations of FIG. 4 may be repeated on those steps until the process flow has been fully executed.

As an example of the operations of FIG. 4 in an embodiment, consider the "Set Credit Limit" step of the process flow shown in FIG. 2. At block 401, the "Set Credit Limit" step would be identified. At block 402, any data for the "Set Credit Limit" step would be retrieved. This data may include, for example, credit data about a particular individual, and it may include data computed during the performance of a previous step of the process flow.

At block 403, this data is processed, for example with a decision tree associated with the "Set Credit Limit" step. The decision tree may be internally stored, for example, in a form shown in FIG. 6. Based on the decision tree or other processing, one or more outputs are calculated. The outputs may be, for example, credit limits determined to be appropriate for the individual based on the credit data and other data from block 402.

At block 404, it is determined whether monitoring is enabled on the "Set Credit Limit" step. If it is, then at block 405, the calculated outputs are stored, along with possibly other information such as the information retrieved at block 402. At block 406, any next steps associated with the "Set Credit Limit" step are identified. In the example of FIG. 2, the next step would be the "Manual Underwriting Required" determination. That next step would then be identified to be performed.

In an embodiment, the development software further includes monitoring functionality that includes a suite of reports for various business problems. The monitoring functionality may be configured to suit each client's solution, run automatically against the data at regular intervals, identify issues in any part of a strategy represented by a process flow, and/or provide reports that are defined and reviewed in the same software user interface as shown in, for example, FIG. 2.

Figure 5:
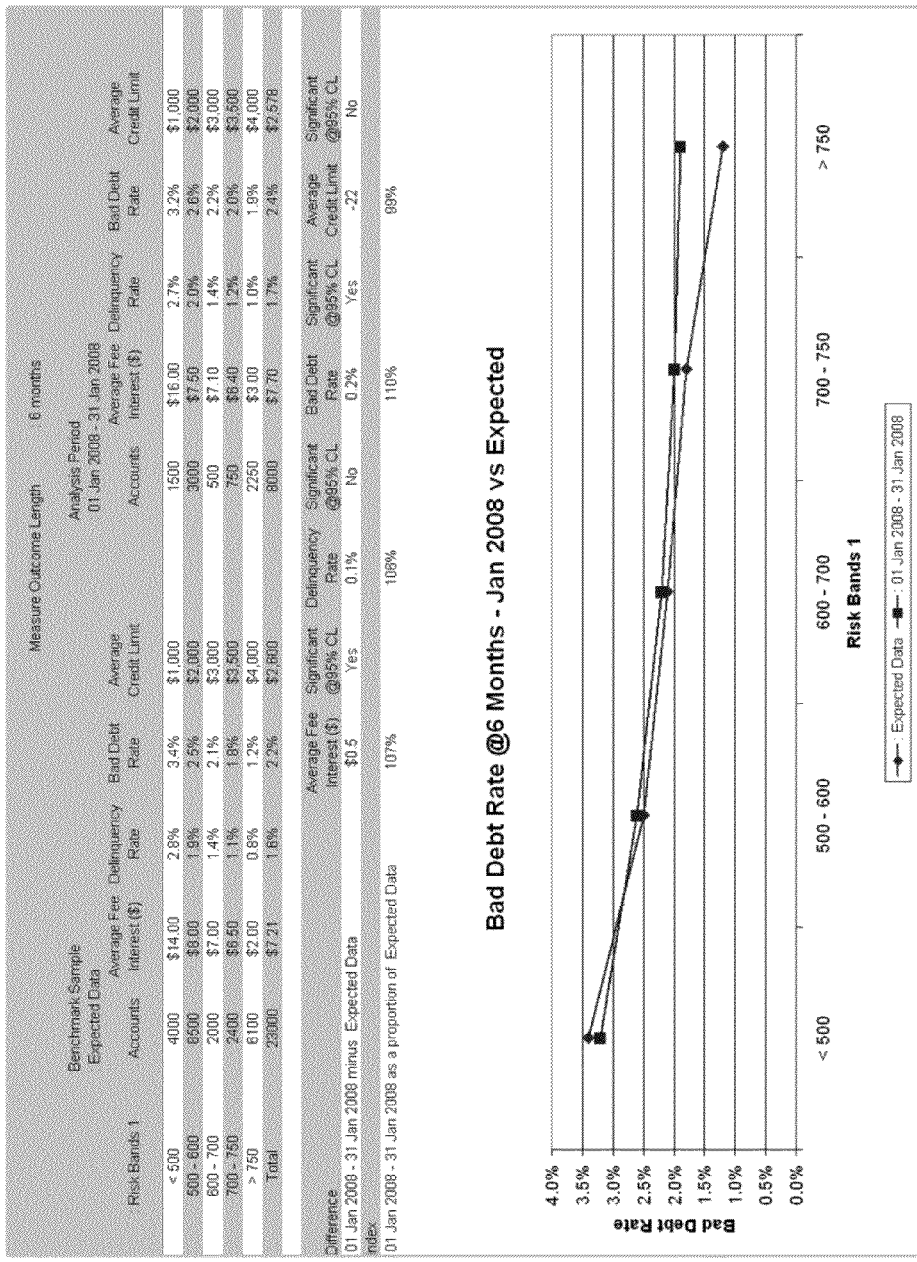
FIG. 5 is an embodiment of a Bad Debt Rate report which includes both a tabular and a graphical view of the performance of a strategy represented by a process flow.

Some examples of reports that may be generated include: an acceptance rate report, a referral analysis report, a score discrimination report, a terms of business comparison report, an advanced management report, and so on. An example of one such report is shown in FIG. 5. The report shown in FIG. 5 is a sample Bad Debt Rate report which includes both a tabular and a graphical view of the performance of a strategy represented by a process flow. This sample report displays higher bad debt rates than expected in the top score band, indicating that perhaps limits that are too high are extended to parts of this population. In one embodiment, the charts can be drilled into from the software user interface, as the data used to generate this report is available for analysis and further improvement of the process flow. Reports such as that shown in FIG. 5 may aid a user in determining that there is a problem and/or a possible enhancement to a process flow. For example, reports may be generated based on stored monitoring data, as discussed above, and using preconfigured report styles such as templates, in order to provide insight into the effectiveness of a strategy represented by a process flow.

In an embodiment, the software enables users to create decision algorithms such as decision trees. Such decision trees may be used as part or all of a step of a process flow. For example, the step of setting a credit limit shown in process flow 209 of FIG. 2 may involve a decision tree for determining appropriate credit limits for an individual being processed according to the process flow.

In other embodiments, decision algorithms may be embodied in forms other than a decision tree, such as a Boolean expression, a class set, a matrix, a segmentation tree, a test group set, a treatment table, and/or any other form of decision algorithm, as well as any combination of the above.

Figure 6:
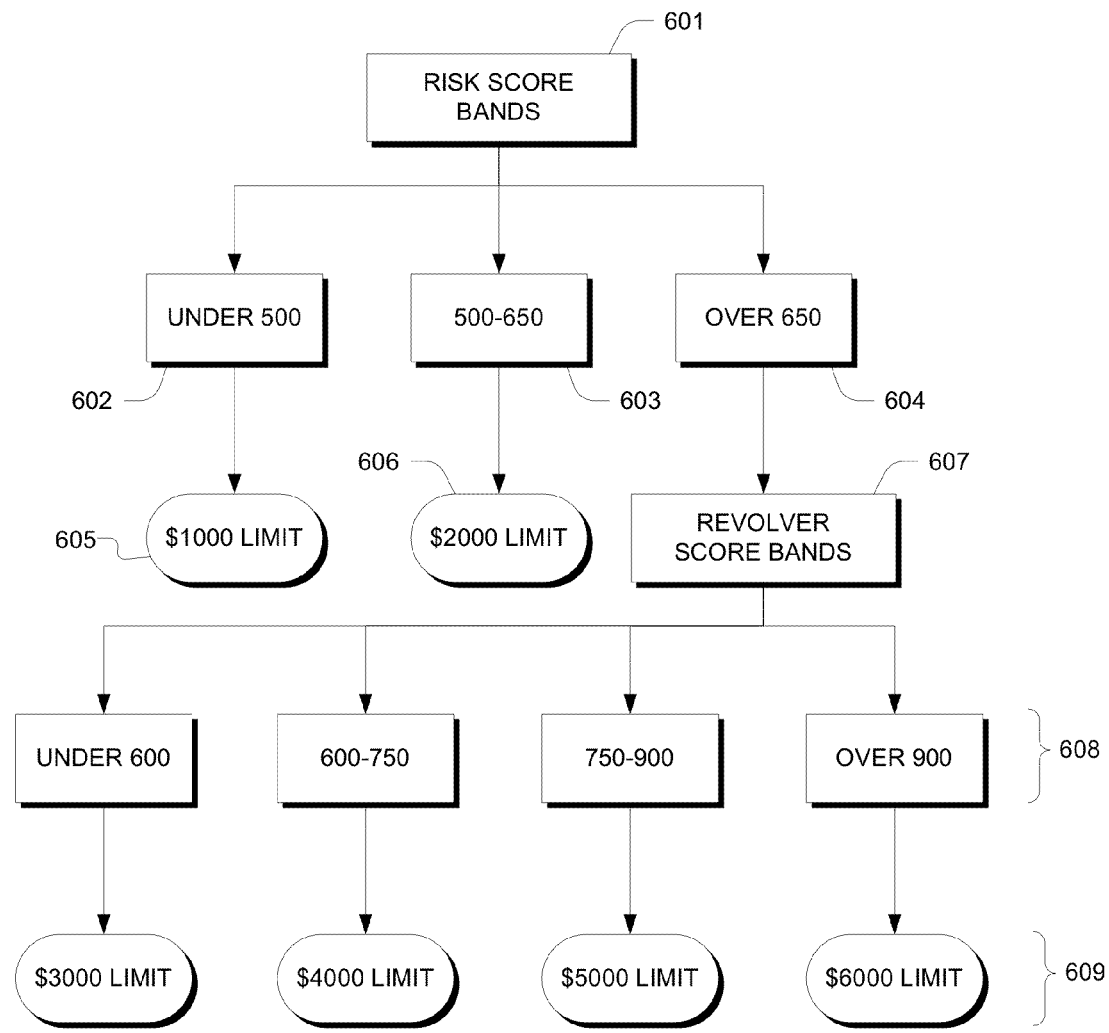
FIG. 6 depicts an example decision tree for setting a credit limit as used in an embodiment.

FIG. 6 depicts an example decision tree for setting a credit limit as used in an embodiment. The decision tree may be represented internally in a computer-readable format so that it may be executed by a computer such as production server 102 or manager computer 101 of FIG. 1.

The tree shown in FIG. 6 includes a number of nodes. At the top of the tree is node 601 labeled "risk score bands." When this decision tree is executed for a particular individual, the risk score for that individual may be identified at this node. Node 601 has three sub-nodes 602, 603, and 604 representing various categories of risk scores. The individual's particular risk score would be compared to these three nodes so that an appropriate action may be taken. For example, if the individual's risk score is under 500 then node 602 would be applied. Accordingly, output 605 would be applied to the individual so that a $1,000 credit limit would be given. Similarly, if the user's risk score is between 500 and 650, then node 603 would be applied and the user would receive a $2,000 credit limit as shown in output 606.

Nodes 602 and 603 may be called "leaf nodes" because, when they are reached, no further decision need be made and an output may be immediately determined. In contrast, node 604 is not a leaf node because further decision is required at that point. If the individual's risk score is over 650, then execution must proceed to node 607 where the individual's revolver score may be retrieved. Based on the revolver score, various credit limits may be granted to the user as shown in nodes 608 and outputs 609.

The risk score and revolver score described here are metrics calculated about individuals based on personal information. For example, the risk score may be a credit score or other metric of credit risk, and the revolver score may be a measure of the individual's use of revolving credit. Other metrics and scores may be included in a decision tree. Additionally, non-numeric data may be included in a decision tree. For example, an individual's marital status may be included in the tree.

In an embodiment, each node on a decision tree may include several parameters. A node may be associated with a data parameter, such as the risk score or revolver score. A node may further be associated with a condition, such as a set or range of values, or other logical test. The condition and/or the associated data parameter may be used to determine whether a particular individual falls within the scope of a node. Additionally, a node may be associated with one or more outcomes. Nodes may also be associated with one or more subnodes or children nodes, indicating further conditions to be tested with respect to an individual who falls within the scope of the node.

In an embodiment, the design software enables manipulation of a decision tree such as that shown in FIG. 6, and performs various processes (discussed herein) in order to assist the user in developing, extending, and/or otherwise optimizing the decision tree. Such manipulation may be done by interaction with a graphical user interface or other interface. In alternate embodiments, such manipulation may be done by keyboard, text commands, and/or computer-readable files or instructions.

FIG. 7 shows a sample user interface for modifying a decision tree, as used in an embodiment. The interface may be displayed, for example, on a manager computer 101 of FIG. 1. The interface of FIG. 7 may be included, for example, in design pane 201 of FIG. 2. The embodiment shown in FIG. 7 relates to modifying a decision tree associated with the "set credit limit" step of process flow 209 of FIG. 2. Other steps of process flow 209 may be similarly customized using this and/or other interfaces.

Each of the nodes of the decision tree being created is depicted in a tree of nodes 701. The nodes may be expanded or collapsed using buttons 702, thereby enabling ease of viewing and modification of the decision tree.

In an embodiment, the nodes of the decision tree are applied to a benchmark data set in order to provide sample statistics and/or other information. For example, column 703 displays the number of cases in the benchmark data set that correspond with each of the nodes 701. Column 704 displays the average credit limit for individuals associated with particular nodes 701. Additional information may be included in various columns and shown on the user interface.

In an embodiment, the outcomes associated with each node of the decision tree may be shown in column 705. Although in FIG. 6 the outcomes shown were simple credit limits, the outcomes shown in column 705 are named entities which may be associated with numerous parameters, as described subsequently with respect to FIG. 8.

The benchmark data set information shown in column 702 and 703 may be useful to the user in refining the decision tree. In the sample data shown in FIG. 7, the node labeled "751-900" 705 has more cases than any of the other leaf nodes. Thus, one way to possibly improve on the segmentation among the leaf nodes would be to further subdivide the "751-900" score band node. The development software advantageously makes the further segmentation easy to implement by analyzing monitoring data, benchmark data, and/or other data, and providing suggested segmentation changes.

Figures 8, 9:
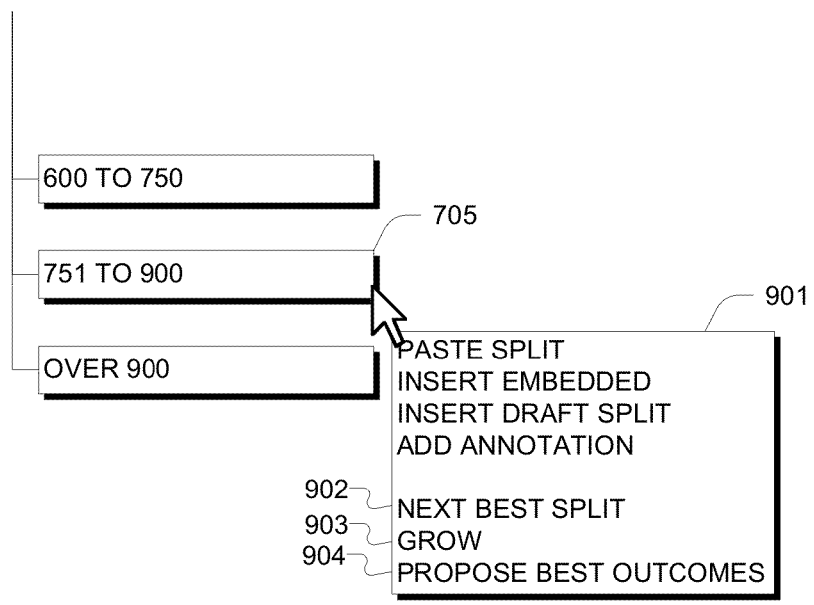
FIG. 8 shows a sample user interface for managing outcomes as used in an embodiment.
FIG. 9 depicts a user interface for selecting among various options for assisting in modifying a decision tree, as used in an embodiment.

FIG. 8 shows a sample user interface for managing outcomes as used in an embodiment. The outcomes may be associated with leaf nodes as shown in column 704 of FIG. 7.

The interface includes a table with columns for names of outcomes 801, colors of outcomes 802, whether or not the outcome is active 803, and a treatment for the outcome 804. The treatment may include a specification of how an individual should be treated given a particular outcome. For example, as shown in FIG. 8, if the outcome determined for a particular individual is "Max Gold" then the individual will be offered a $4,000 credit limit.

The interface may enable a user to add, modify, and/or remove particular outcomes. Additionally, the treatment may include other related and relevant information such as credit card, contract terms, interest rates, penalty rates, and the like. The interface may provide options for creating, modifying, and otherwise managing various treatments for outcomes.

In an embodiment, decision trees such as that shown in FIG. 7 may be modified either automatically or manually. The software may provide various tools for automatically modifying a decision tree and/or assisting the user in determining how to modify a decision tree.

FIG. 9 depicts a user interface for selecting among various options for assisting in modifying a decision tree, as used in an embodiment. When a user selects a particular node 705 of the tree, for example by clicking on it, a menu 901 may be displayed. The menu may include several options including "next best split" 902, "grow" 903, and "propose best outcomes" 904, as well as other options and/or any subset of these options. Each of these three options will be described in turn.

The "next best split" option 902 enables the user to initiate analysis of outcome data by the development software, in order to develop a proposed further segmentation of the selected node, in an embodiment. The user may be provided with the option to indicate a quantity of additional subnodes into which the selected node should be segmented, or the user may simply use a default number of subnodes. Additionally, the user may be able to select one or more data parameters to be analyzed or optimized. Once these and/or other options are selected, the development software performs an analysis and returns a proposed further segmentation.

In one embodiment, the analysis is performed using data that was used in creating a report, monitoring data, and/or benchmark data. Other data may be used, and/or a combination of data may be used, in various embodiments. In some situations, simulated or modeled data may be used in the analysis.

FIG. 10 is a flowchart of an algorithm for performing the next best split analysis, as used in an embodiment. The algorithm may be performed, for example, on manager computer 101 of FIG. 1 in the process of designing a decision tree. In various embodiments, additional blocks may be included, some blocks may be removed, and/or blocks may be connected or arranged differently from what is shown.

At block 1001, a selection of a leaf node or other node for splitting is received. The selection may be made, for example, by the user clicking on the particular node to be split. In an embodiment, if the user selects a node that is not a leaf node, then the system may, in some embodiments, remove any children of the selected node prior to performing the next best split analysis.

At block 1002, the parameters for potential splits are identified. These parameters may include, for example, a number of subnodes to create, one or more parameters to be analyzed and/or optimized, one or more factors on which the splitting should be performed, a set of parameters on which splitting is to be permitted, and so on.

Then, a set of splits, with associated subnodes, is calculated at block 1003. A "split," as used here, refers to an identified parameter associated with individuals that is to be used to categorize those individuals within the decision tree. The splits and subnodes may be calculated using statistical algorithms, artificial intelligence algorithms, heuristic calculations, optimization algorithms, and the like. The calculation should result in one or more sets of new leaf nodes to be proposed for addition as children to the selected node. Additionally, appropriate values for the conditions of each of the leaf nodes may be calculated. For example, the calculation may determine that a split based on the marital status parameter is appropriate. Thus, it may propose adding three new subnodes, one representing a status of "single," one representing a status of "married," and one representing a status of "divorced." In some cases, the calculation may determine that it is preferable to bundle one or more of the categories together, for example creating a new subnode representing the statuses of "single/divorced."

In addition to calculating the conditions for the new subnodes created by the next best split algorithm, a set of correlations may also be calculated. The correlations may indicate, for example, how optimal a particular split is or how strongly the particular split correlates with a desired factor. Such correlations may be used by the user to assess which of the splits is best. Alternately, in an embodiment, the user is not asked to review the proposed splits, and the system automatically selects the best split based on a correlation value calculated at block 1003.

In the case where the user is queried for inputs, the system displays the potential splits, and associated values and correlations, at block 1004. Such a display may be made in a user interface such as that shown in FIG. 11.

At block 1005, the user may select one of the potential splits automatically generated by the software. Alternately, the user may wish to modify parameters to the next best split algorithm, in which case the process may return to block 1001 or 1002.

At block 1006, the new leaf nodes calculated by the next best split algorithm and optionally selected by the user at block 1005 may be merged into the existing decision tree. Thus, the decision tree may be expanded upon completion of the next best split algorithm.

At block 1007, the software may optionally automatically propose outcomes for the new leaf nodes calculated by the next best split algorithm. A procedure for proposing best outcomes for these new nodes is shown, for example, with reference to FIG. 14. The user may then accept and/or modify the automatically proposed outcomes for each of the new nodes. Alternately, the system may not calculate outcomes for the new nodes generated by the next best split algorithm, but instead may simply assign each of those new nodes a default outcome or no outcome.

At block 1008, the software optionally continues to split the newly created subnodes. This is used for example, in the "grow" option 903 of FIG. 9. If such an option is enabled, then the system may perform calculations such as determining whether further splitting of subnodes is advantageous and/or determining which subnodes to split, based on various metrics and calculations. If the optional block 1008 is performed, then execution again proceeds to block 1002 to further perform the next best split algorithm on the subnode(s) selected at block 1008.

The assisted design techniques of the development software as so described herein allow a predictive strength analysis of multiple attributes. For example, a particular segment or node may be selected for splitting and/or growing of the decision tree, for example by selecting the "next best split" option 902 or the "grow" option 903 of FIG. 9, in order to cause the development software to determine a number of characteristics that could be used in segmentation which are better predictors of characteristics, such as bad debts. Thus, the automated features of the embodiments described herein are advantageously more effective than manual analysis and creation of decision trees.

Once the decision tree has been augmented based on any of the various mechanisms described herein, the decision tree and/or process flow may be updated and sent to be used in a production environment automatically. For example, manager computer 101 shown in FIG. 1 may apply the next best split algorithm or a grow procedure to an existing decision tree and then send the updated decision tree and/or process flow to production server 102, simply by clicking an appropriate button or otherwise interacting with a user interface on manager computer 101. The new process flow and/or decision tree may then replace on existing process flow being used in production or it may be used as a challenger strategy to run against a chosen random population of future decisions.

FIG. 11 shows a sample user interface displayed during a next best split analysis, as used in an embodiment. The user interface of FIG. 11 may be shown in a portion of design pane 201 of FIG. 2, for example. The interface of FIG. 11 may be shown during the performance of block 1004 of FIG. 10, for example.

The interface of FIG. 11 may display various parameters 1101 that were applied to the next best split algorithm. Additionally, the interface may display a table 1102 of the resulting proposed splits. Column 1103 of the table may show each of the parameters or attributes suggested by the algorithm as a potential candidate for splitting. For example, as shown in FIG. 11, the revolver score card score 1104 has been recommended by the next best split algorithm as a potential candidate for splitting.

Clicking the expansion interface element 1105 may display the proposed new nodes calculated by the next best split algorithm. In the example shown in FIG. 11, the algorithm has proposed splitting the "revolver scorecard score" attribute into three leaf node categories: scores of under 780 1106, scores between 780 and 800 1107 and other scores 1108.

Table 1102 may include further information that may assist the user in evaluating the various proposed splits. For example, column 1104 displays a predictive ranking indicating the quality of each of the various proposed splits. In the example shown in FIG. 11, column 1104 indicates that the "revolver scorecard score" split is better than either the "marital status" split or the "monthly disposable income" split.

Column 1105 displays the number of records that fall into each of the proposed subnodes for the split. For example, subnode 1106 would be associated with 2,195 records, subnode 1107 would be associated with 1,355 records, and subnode 1108 would be associated with 4,860 records. The information may be useful to a user in evaluating the quality and/or usefulness of a particular proposed split.

Column 1106 displays a calculated statistic or correlation indicating the quality of the splits. Statistical measures such as GINI, Chi-square, Omega-square, and so on, can be included to illustrate the improvement in predictive strength over the original segmentation. In an embodiment, multiple statistical measures can be displayed to the user as additional columns of data.

FIG. 12 shows a sample user interface of a decision tree after merging a selected split calculated by the next best split algorithm, as used in an embodiment. In the example shown in FIG. 12, the decision tree initially appeared as it does in FIG. 7, and then the user selected node 705 and performed a next best split analysis. Subsequently, after the interface of FIG. 11 was shown, the user selected the first split proposed in column 1104 to be merged into the existing decision tree, resulting in the tree shown in FIG. 12. Accordingly, node 705a shown in FIG. 12 now includes several leaf nodes as children, namely nodes 1201, 1202, and 1203.

In an embodiment, the user can merge the proposed splits into the existing decision tree with a single click or other command so that the proposed split automatically becomes part of the decision tree. Thus, the user can generate and/or add to existing decision trees or other structures through a tree-building process that is automated, with the flexibility to allow user customization where desired.

In another embodiment, the system automatically adds proposed split nodes to the tree without requiring further user interaction, thereby further increasing the automation of the software.

Figure 13:
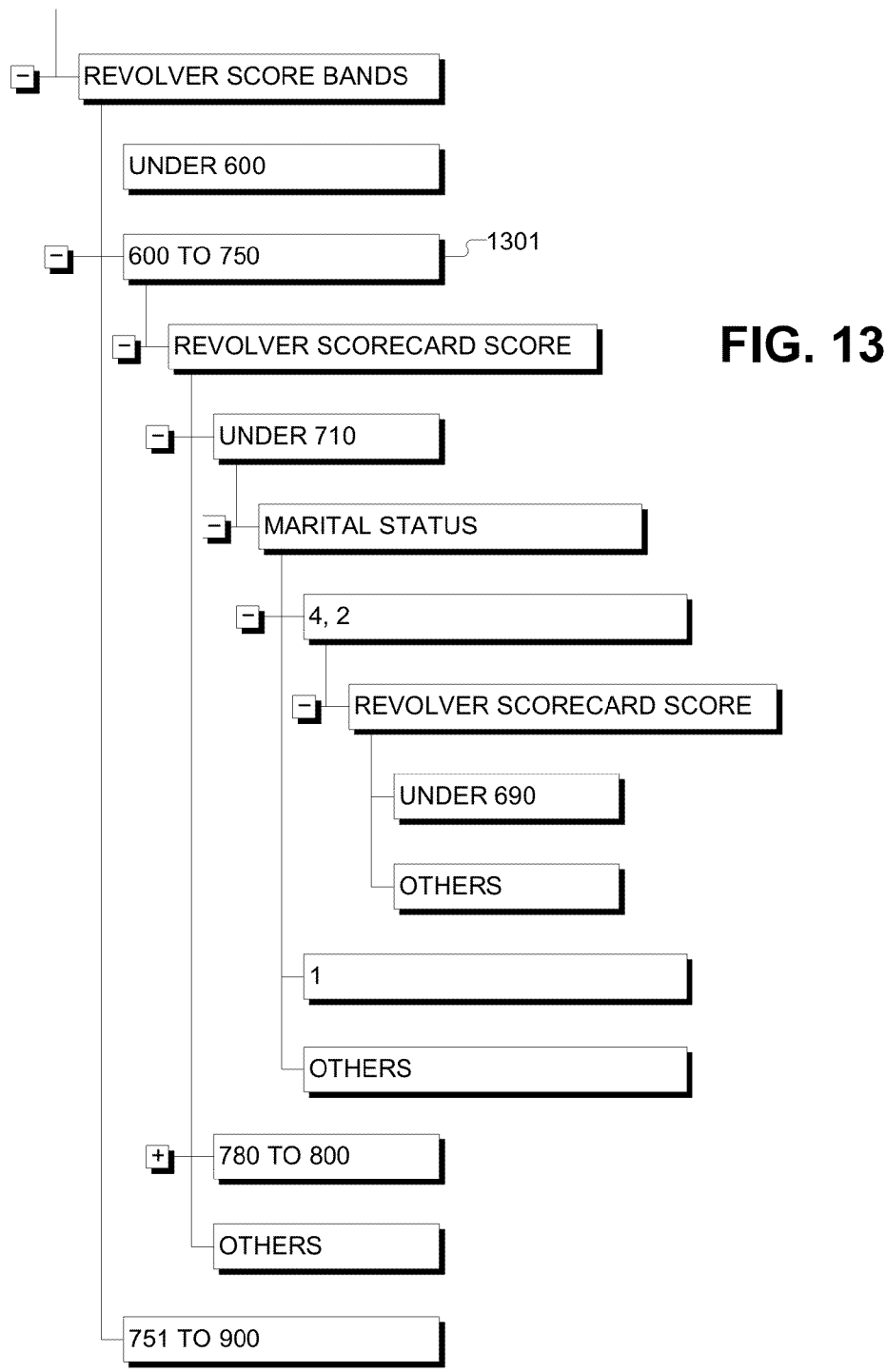
FIG. 13 illustrates another decision tree that has been grown, in an embodiment.

FIG. 13 illustrates another decision tree that has been grown by use of the "grow" option 903 of FIG. 9, in an embodiment. In this embodiment, the revolver score band node 1301 has been automatically grown to three further levels of nodes, based on the "revolver score card score" parameter, the "marital status" parameter, and further segmentation based on the "revolver score card score" parameter. The analysis may be automatically performed based on benchmark data, monitoring data, and/or any other data available to the system. Additionally, the user may provide inputs to the "grow" option, such as a number of splits to make per level, a number of levels to create, and one or more parameters to be optimized. These inputs are applied to the "grow" algorithm, which may be a simple variant of the "next best split" algorithm shown in FIG. 10 employing recursive splitting of nodes.

The "next best split" and "grow" options provide automated and assisted mechanisms for increasing the number of nodes in a decision tree, thereby improving the granularity and prediction power of the decision tree. However, the decision tree must also be able to determine appropriate outcomes for any particular leaf node. Accordingly, embodiments of the software provide functionality for automatically proposing outcomes for leaf nodes on the decision tree.

FIG. 14 is a flow chart of a process of automatically proposing outcomes for decision trees, as used in an embodiment. The process may be performed, by example, by a manager computer 101 shown in FIG. 1.

At block 1401, a selection of leaf nodes is received. The leaf nodes may be selected by the user, for example, by clicking on individual nodes and/or by clicking on a common parent to a set of nodes. Additionally and/or alternatively, the leaf nodes may be automatically selected when they are created, for example, by a next best split or grow operation. This may be the case, for example, where optional block 1007 of FIG. 10 is performed.

At block 1402, allocation rules and constraints are received to be used in automatically proposing outcomes. The allocation rules and constraints may include, for example, one or more parameters to the optimized or analyzed, and one or more parameters, associated with either particular outcomes or with the overall outcome, that are to be satisfied, optimized, or otherwise considered by the algorithm. Additionally, the allocation rules and constraints may include a selection of one or more algorithms to be used to calculate parameters such as forecast or prediction parameters. For example, if a user wishes to optimize or constrain a parameter of "predicted future spending," the user may be given the option to select an algorithm or formula for calculating predicted future spending. In an embodiment, the user may be able to specify a custom algorithm or formula by providing executable instructions or mathematical formulas to the user interface.

At block 1403, a set of outcomes for the selected leaf nodes is calculated. The calculation may be performed using artificial intelligence, optimization, statistical and/or heuristic algorithms based on the allocation rules and constraints received at block 1402 and/or data such as benchmark data, monitoring data, and/or other data.

Once the proposed outcomes have been calculated, they may optionally be proposed to the user at block 1404. This may be done, for example, by showing the user an appropriate user interface, such as a preview of the proposed outcomes on the decision tree. At block 1405, user input is received indicating whether the proposed outcomes are acceptable and/or indicating modifications to the proposed outcomes or the rules and constraints.

At block 1406, the software automatically applies the proposed outcomes, optionally with any user modifications made at block 1405, to the decision tree. In an embodiment where blocks 1404 and 1405 are not performed, the outcomes may be automatically applied to the tree once they have been calculated.

FIG. 15 is a sample user interface for specifying rules and constraints for the calculation of proposed best outcomes, as used in an embodiment. The user interface may be presented as a part of design pane 201 of FIG. 1, for example. The interface of FIG. 15 may be presented upon selection of the "proposed best outcomes" option 904 of FIG. 9, for example.

The user may be able to select parameters to be optimized, such as the sum of credit limits 1501. The user may further be able to indicate whether to maximize, minimize, or perform some other analysis of the measured parameter, at input element 1502.

Additionally, the user may be able to specify a set of constraints on the best outcomes calculation using table 1503. As shown there, the user may specify, for example, a maximum bad debt amount in column 1504 and/or a maximum credit limit amount 1505, for the overall calculation and/or for particular outcomes.

Additionally, the user may be able to specify which outcomes may be applied to the selected leaf nodes, using column 1506. Thus, as shown in the example of FIG. 15, the best outcomes calculation will attempt to maximize the sum of credit limits while ensuring that the "overall bad debts" total value remains under $10 million and the "overall credit limits" total value remains under $80 million.

Radio buttons 1507 enable the user to choose whether the "propose best outcomes" calculation assigns outcomes to all of the selected nodes or only nodes that currently have no outcome assigned. Thus, the user may be able to use the algorithm to improve upon an existing assignment of outcomes to nodes, or the user may be able to use the calculation with respect to newly created nodes, such as nodes generated by the next best split algorithm.

FIG. 16 is a sample user interface displaying proposed best outcomes, as used in an embodiment. The interface may be displayed, for example, at block 1404 of FIG. 14. It may be displayed in design pane 201 of FIG. 2, for example, so that the user interface shows the proposed decision tree rather than the existing decision tree. In an alternate embodiment, both the existing decision tree and the proposed decision tree may be shown side-by-side or in any other fashion.

The outcomes assigned by the "propose best outcomes" calculation may be shown in column 1601. In an embodiment, the outcomes that have been changed and/or added by the algorithm may be highlighted so that they may be easily found by the user. Additionally, informational statistics, such as the sum of credit limits for each of the nodes, may be shown in column 1602, and the sum of bad debt for each of the nodes may be shown in column 1603. These and other statistics that may be included may assist the user in evaluating whether any changes are required to the proposed outcome and/or to the overall decision tree.

In an embodiment, the user is easily able to view previous values by hovering a mouse cursor over an appropriate portion of the user interface and/or any other appropriate user interaction, as shown by box 1604.

The interface may further include a summary table 1605 of information about the proposed best outcomes. For example, the table may display the sum of credit limits for each of the outcomes in column 1606, and the sum of bad debts for each of the outcomes in column 1607. This information further enables the user to evaluate the assignment of outcome on the decision tree.

Buttons 1608 allow the user to apply the proposed outcome to the existing tree and/or to modify or cancel the proposed best outcomes. If the user wishes to apply the proposed best outcomes, then the decision tree is automatically updated with the proposed best outcomes as calculated.

SUMMARY

Depending on the embodiment, the systems and methods described with reference to the flowcharts and block diagrams, as well as any other methods discussed herein, may include fewer or additional blocks and/or the blocks may be performed or arranged in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the computing systems 101-102 of FIG. 1 and/or other computing devices illustrated in the Figures, in order to perform the respective methods. For ease of explanation, the methods have been described herein as performed by the various modules, such as may be executed on the computing systems 101-102, which should be interpreted to include any one or more of the computing devices noted above and/or any other suitable computing device.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing devices described herein and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to automatically assist a user in assigning credit terms to a plurality of decision nodes via a graphical user interface, the computing system comprising:
   one or more computer processors;
   a graphical display configured to display one or more user interfaces, the graphical display being connected to the one or more computer processors; and
   one or more human interface devices configured to receive input from a user, the one or more human interface devices connected to the one or more computer processors;

the one or more computer processors configured to receive, via the one or more human interface devices, a selection of a plurality of nodes on a decision tree, each node being associated with benchmark data records of a corresponding group of consumers;

the one or more computer processors configured to receive, via the one or more human interface devices, a specification of one or more credit offer constraints associated with respective credit card offers;

the one or more computer processors configured to determine, for each of the plurality of nodes, based on the credit offer constraints being applied to the benchmark data records of the corresponding group of consumers, a proposed credit card offer having associated credit terms including one or more of a credit limit, an interest rate, or a penalty rate;

the one or more computer processors configured to cause the graphical display to display a user interface including the proposed credit card offers and associated credit terms for each node and related summary statistics for each of the constraints determined based on the benchmark data records, enabling the user to evaluate the proposed credit card offers for respective nodes; and the one or more computer processors configured to apply the proposed credit card offers and associated credit terms to the plurality of nodes based upon an indication from the user accepting the proposed credit card offers and associated credit terms.

2. The computer system of claim 1, wherein the decision tree comprises one or more nodes, wherein each node is associated with a logical condition based on a parameter associated with an individual, and wherein each node is associated with either a credit card offer or one or more nodes as children nodes.

3. The computer system of claim 2, wherein the logical condition includes a range of values associated with the parameter.

4. The computer system of claim 1, wherein the credit offer constraints include an algorithm for forecasting one or more parameters to be optimized.

5. The computer system of claim 1, wherein the user interface is configured to display additional information relating to each proposed credit card offer in response to a user placing a mouse indicator over a portion of the user interface associated with the respective proposed credit terms.

6. The computer system of claim 1, wherein the one or more credit offer constraints include a maximum bad debt, a maximum credit limit, and a maximum number of benchmark data records.

\* \* \* \* \*